(12) United States Patent
Kawano et al.

(10) Patent No.: US 10,205,198 B2
(45) Date of Patent: Feb. 12, 2019

(54) POWER TOOL AND BATTERY PACK

(71) Applicant: Hitachi Koki Co., Ltd., Tokyo (JP)

(72) Inventors: Yoshikazu Kawano, Hitachinaka (JP);
Nobuhiro Takano, Hitachinaka (JP);
Toshiaki Koizumi, Hitachinaka (JP);
Kazuhiko Funabashi, Hitachinaka (JP);
Kenichirou Yoshida, Hitachinaka (JP);
Takao Aradachi, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 15/315,174

(22) PCT Filed: May 22, 2015

(86) PCT No.: PCT/JP2015/064760
§ 371 (c)(1),
(2) Date: Nov. 30, 2016

(87) PCT Pub. No.: WO2015/182515
PCT Pub. Date: Dec. 3, 2015

(65) Prior Publication Data
US 2017/0194670 A1 Jul. 6, 2017

(30) Foreign Application Priority Data

May 30, 2014 (JP) .................................. 2014-113537
Jul. 31, 2014 (JP) .................................. 2014-157165

(51) Int. Cl.
*H02J 7/00* (2006.01)
*H01M 10/42* (2006.01)
(Continued)

(52) U.S. Cl.
CPC .......... *H01M 10/4257* (2013.01); *B25F 5/00* (2013.01); *B60L 3/0046* (2013.01);
(Continued)

(58) Field of Classification Search
CPC ... H02M 10/4257; H02J 7/0004; H02J 7/0032
(Continued)

(56) References Cited

U.S. PATENT DOCUMENTS

2006/0220605 A1 10/2006 Funabashi et al.
2007/0108940 A1 5/2007 Sainomoto et al.
(Continued)

FOREIGN PATENT DOCUMENTS

CN 1967964 A 5/2007
CN 103090983 5/2013
(Continued)

OTHER PUBLICATIONS

Japan Patent Office Notification for Reason of Refusal for patent application JP2016-523473 (dated Aug. 10, 2017), 8 pages.
(Continued)

*Primary Examiner* — Suchin Parihar
(74) *Attorney, Agent, or Firm* — Kilpatrick Townsend & Stockton LLP

(57) ABSTRACT

A power tool includes a motor and control means for controlling the motor. The motor is capable of being driven by power supplied from a battery pack including a battery cell. The control means is configured to continue to rotate the motor even when a motor-halt signal is inputted from the battery pack. With this structure, the power tool can be used continuously without need to halt rotation of the motor, even when receiving a halt signal, such as an overdischarge detection signal or an overcurrent detection signal.

12 Claims, 17 Drawing Sheets

(51) Int. Cl.
*B25F 5/00* (2006.01)
*H01M 10/44* (2006.01)
*H01M 10/48* (2006.01)
*B60L 3/00* (2006.01)
*H01M 2/10* (2006.01)
*H02H 3/05* (2006.01)
*H02H 7/08* (2006.01)
*H02J 1/00* (2006.01)

(52) U.S. Cl.
CPC ......... *H01M 2/1022* (2013.01); *H01M 10/44* (2013.01); *H01M 10/48* (2013.01); *H02H 3/05* (2013.01); *H02H 7/0827* (2013.01); *H02J 7/00* (2013.01); *H02J 7/0004* (2013.01); *H02J 7/0032* (2013.01); *H01M 2010/4278* (2013.01); *H02J 2001/002* (2013.01)

(58) Field of Classification Search
USPC .......................................... 320/165
See application file for complete search history.

(56) References Cited

U.S. PATENT DOCUMENTS

| | | | | |
|---|---|---|---|---|
| 2008/0252263 | A1* | 10/2008 | Funabashi | H02J 7/0031 320/154 |
| 2011/0304287 | A1* | 12/2011 | Yang | G01R 31/3682 318/139 |
| 2012/0293096 | A1* | 11/2012 | Mizoguchi | B25F 5/00 318/139 |
| 2013/0062955 | A1 | 3/2013 | Suzuki et al. | |
| 2013/0108904 | A1* | 5/2013 | Okabayashi | H01M 10/486 429/90 |

FOREIGN PATENT DOCUMENTS

| | | |
|---|---|---|
| EP | 2562895 A1 | 2/2013 |
| EP | 2565661 A1 | 3/2013 |
| JP | 2006-281404 A | 10/2006 |
| JP | 2007-143284 A | 6/2007 |
| JP | 2011-211861 A | 10/2011 |
| JP | 2012-023911 A | 2/2012 |
| JP | 2012-115958 A | 6/2012 |
| JP | 2014-050942 | 3/2014 |
| WO | WO2011/122969 A1 | 10/2011 |
| WO | WO2012/096198 A2 | 7/2012 |
| WO | WO2014/038165 A1 | 3/2014 |

OTHER PUBLICATIONS

International Report on Patentability for application PCT/JP2015/064760 (dated Dec. 15, 2016), 10 pages.
International Search Report for international application PCT/JP2015/064760 (dated Aug. 4, 2015).
European Patent Office Extended Search for EP15799537.4 dated Jan. 3, 2018, 9 pages.
China Patent Office office action for patent application CN201580029253.4 (dated Jul. 18, 2018), 17 pages with translation.

* cited by examiner

FIG. 2

|  | BATTERY PROTECTION IC DETECTION | CONTINUOUS PERIOD |
|---|---|---|
| OVERCURRENT PROTECTION | CURRENT: 75 A OR GREATER | 0.5S |
| OVERDISCHARGE PROTECTION | VOLTAGE: 2.0 V OR LOWER | 1S |

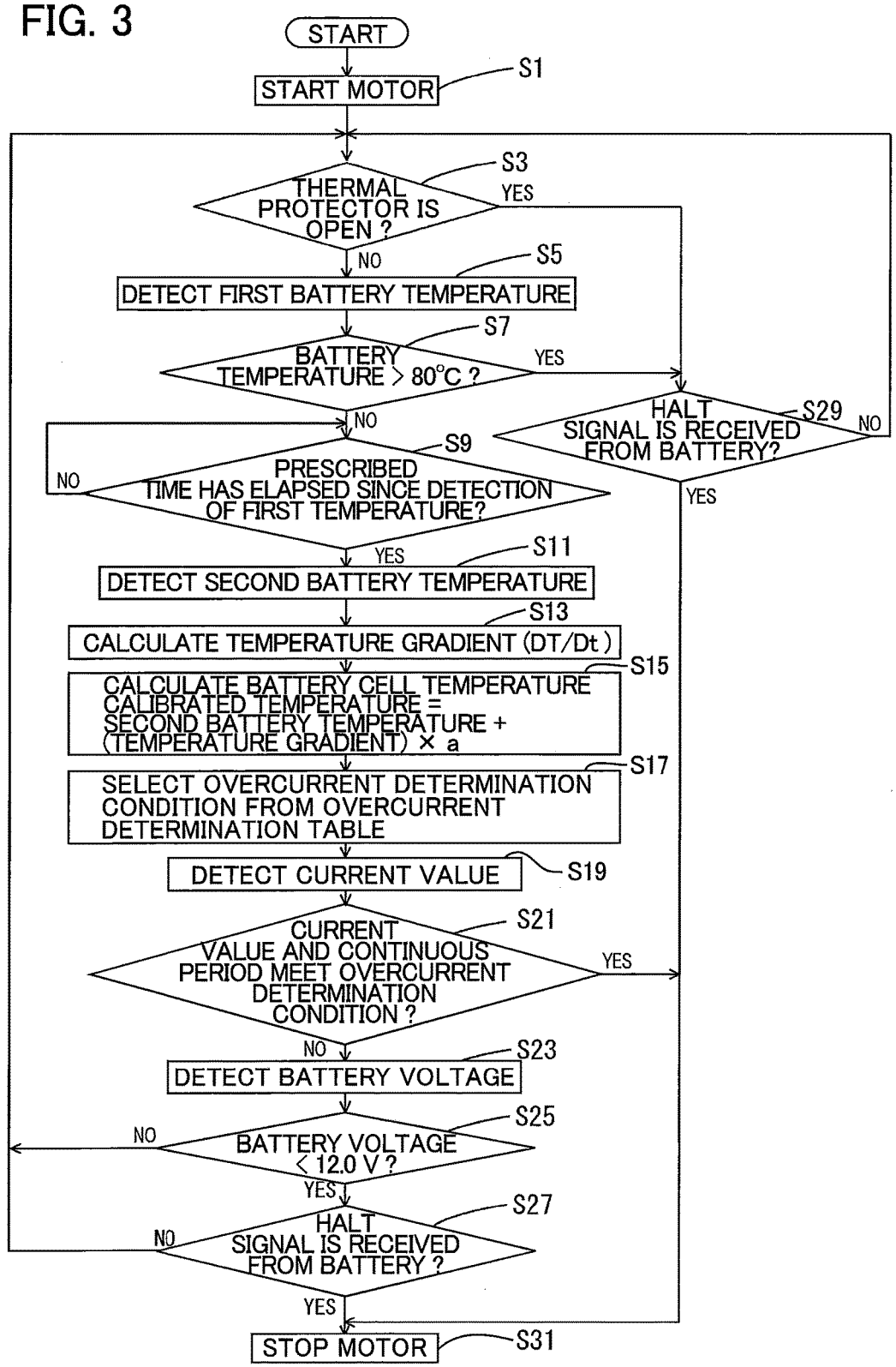

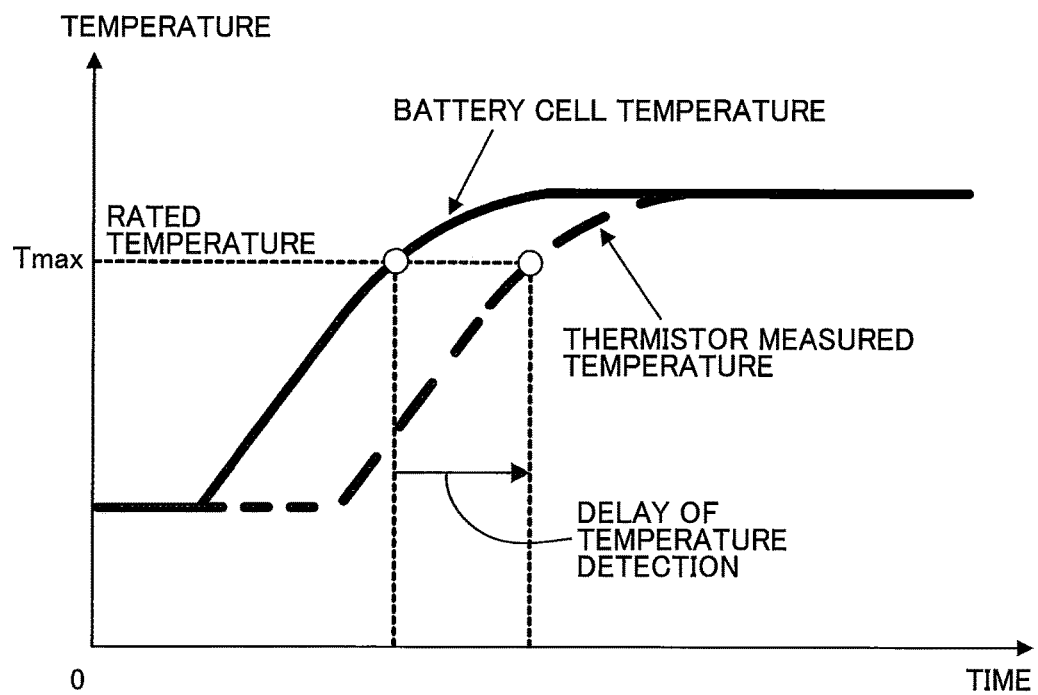
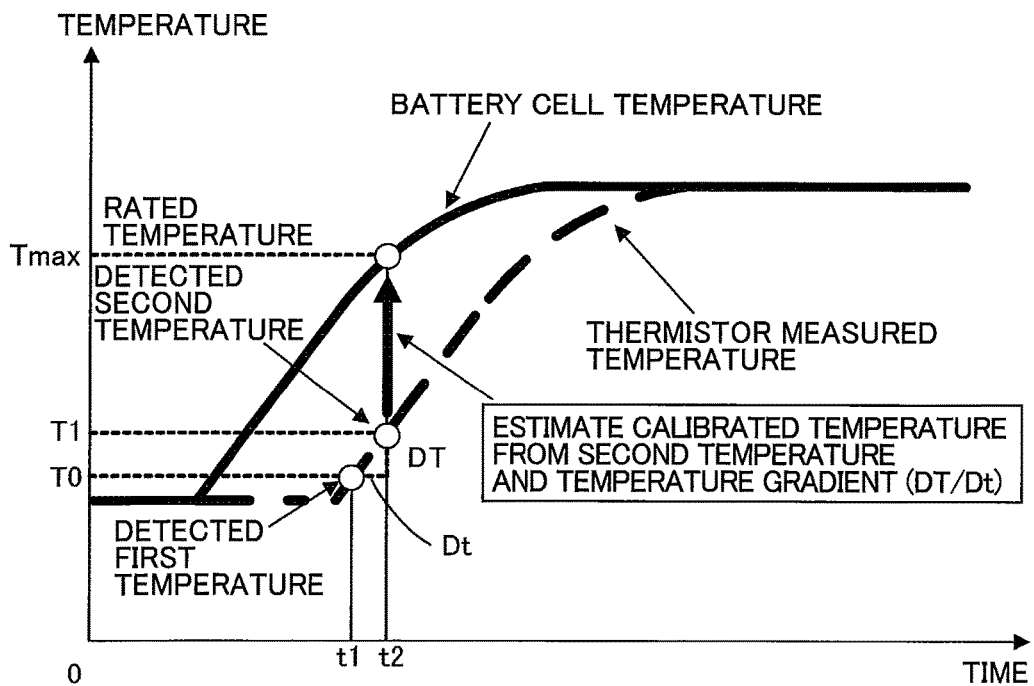

FIG. 6
| CALIBRATED TEMPERATURE (Tc) | CURRENT VALUE | CONTINUOUS PERIOD |
|---|---|---|
| Tc ≦ 55°C | 100A | 10s |
| 55°C < Tc ≦ 60°C | 100A | 7s |
| 60°C < Tc ≦ 65°C | 95A | 5s |
| 65°C < Tc ≦ 70°C | 90A | 3s |
| 70°C < Tc ≦ 75°C | 85A | 2s |
| 75°C < Tc ≦ 80°C | 80A | 1s |
FIG. 7
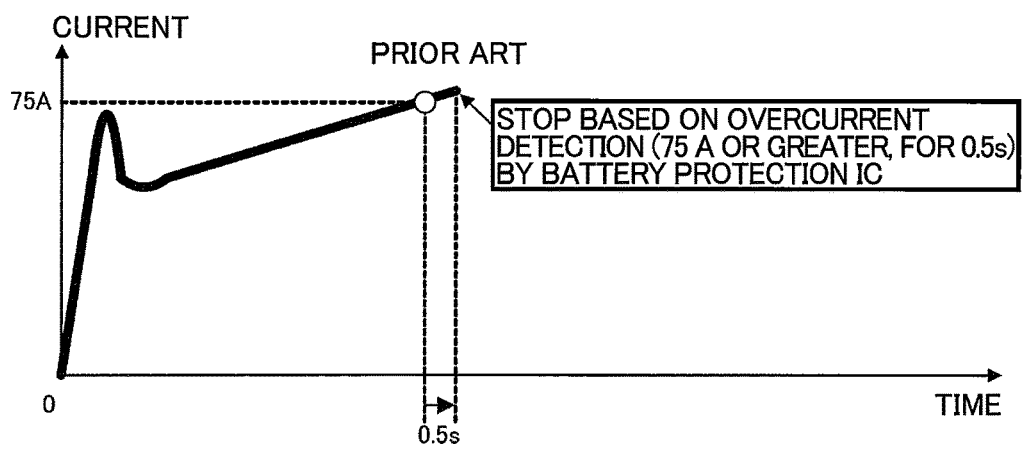
FIG. 8
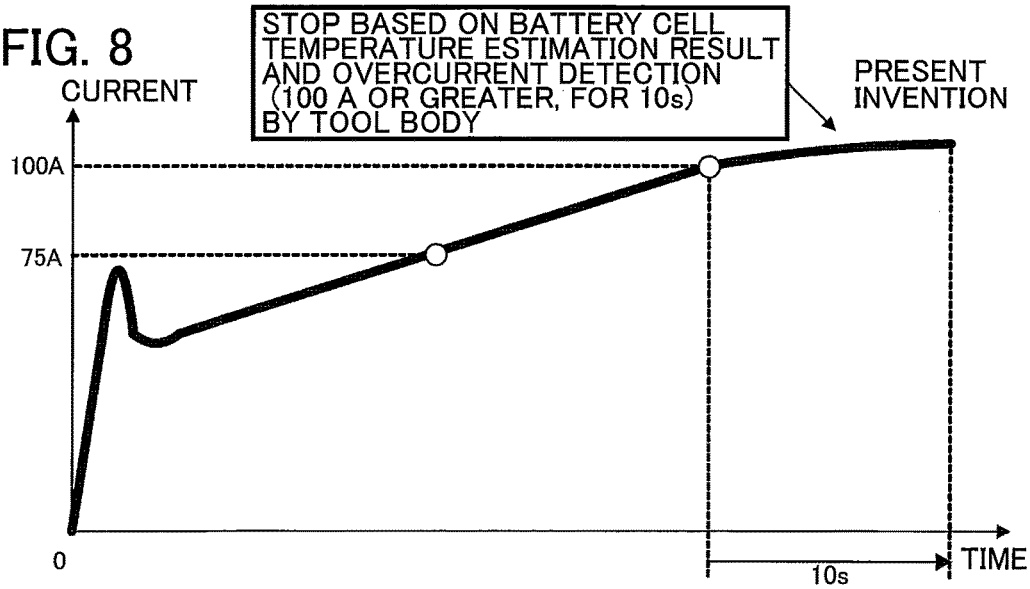

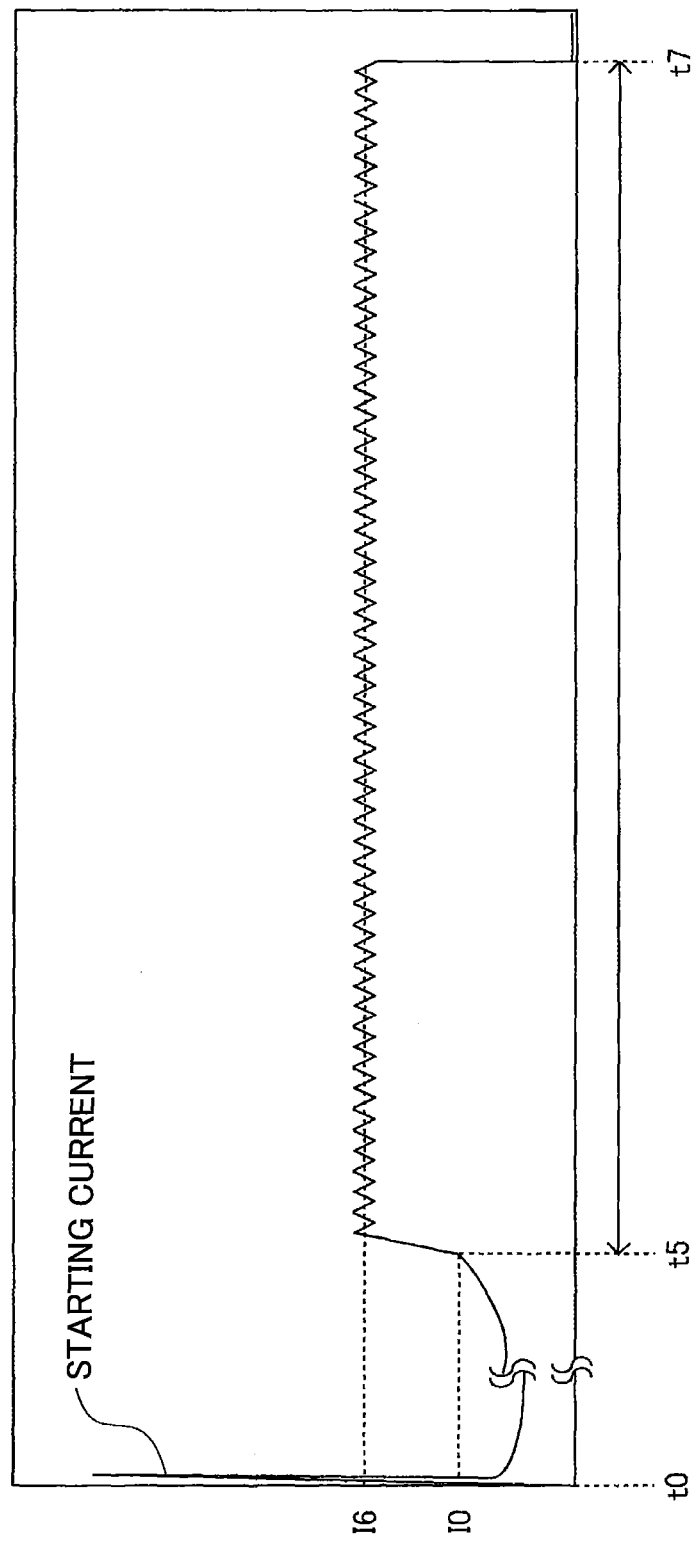

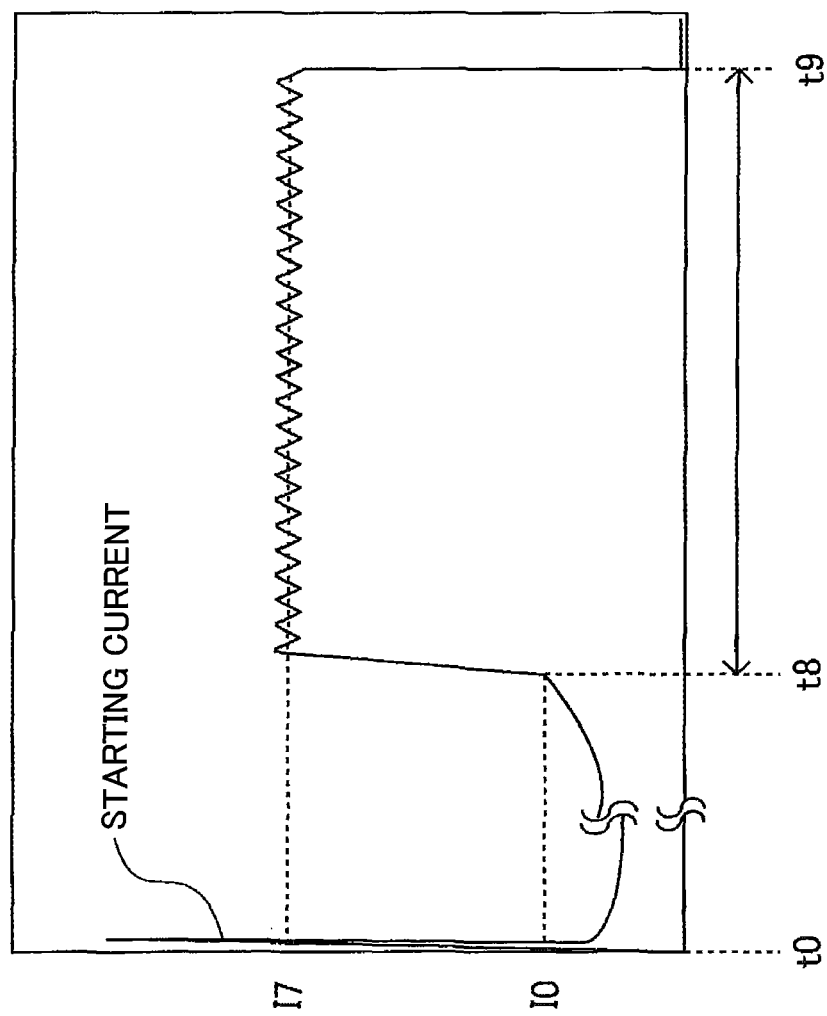

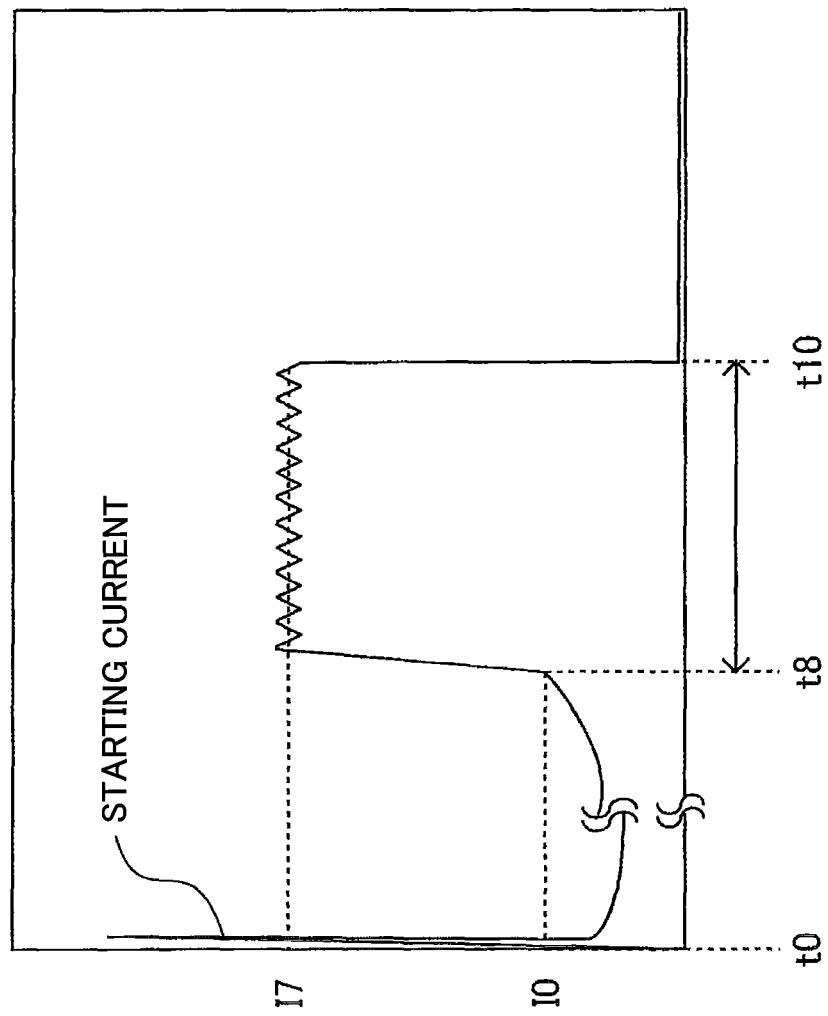

POWER TOOL AND BATTERY PACK

TECHNICAL FIELD

The present invention relates to a power tool that is driven by secondary batteries, and to a battery pack housing the secondary batteries.

BACKGROUND ART

A power tool that can be connected to a battery pack is well known in the art (see PLT 1, for example). When a power tool of this type receives an overdischarge detection signal or an overcurrent detection signal from the battery pack, the power tool instantly halts rotation of the motor.

On the other hand, battery packs housing secondary battery cells are commonly used to power electric equipment and have been used extensively as the driving power source for power tools in particular. Various proposals have been made for this type of battery pack, aiming at eliminating the battery pack malfunctions that are caused by discharge current and may occur when the battery pack is used as a driving power source for a power tool.

For example, one technology proposed for reducing the occurrence of battery pack failure caused by overcurrent (PLT 2) outputs a halt signal to halt driving of the power tool when the discharge current from the battery pack exceeds an overcurrent threshold at which the discharge current is judged to be excessive. The outputted halt signal interrupts the drive of the power tool and electrical discharge from the battery pack.

CITATION LIST

Patent Literature

PTL 1: Japanese Patent Application Publication No. 2012-115958
PTL 2: Japanese Patent Application Publication No. 2006-281404

SUMMARY OF INVENTION

Technical Problem

However, while the power that can be outputted by a battery pack differs depending upon the temperature of the secondary batteries, the conventional battery pack described above outputs an overdischarge detection signal without consideration for temperature. Therefore, if the temperature of the secondary batteries is not high, the secondary batteries may still be allowed to further output power even when an overdischarge detection signal or an overcurrent detection signal has been outputted. Yet according to the conventional method of control, the power tool immediately halts rotation of the motor upon receiving an overdischarge detection signal or an overcurrent detection signal. Consequently, the conventional power tool cannot take sufficient advantage of power which can be outputted by the battery pack.

Further, the overcurrent threshold for the battery pack described above is a fixed value that is set on the basis of the rated discharge current and the like of the battery pack. Consequently, when the conventional battery pack is used for a power tool that operates under heavy load, the discharge current may frequently exceed the overcurrent threshold, resulting in the drive of the power tool being frequently halted. Thus, it is difficult to simultaneously pursue a battery pack that maximizes performance of the power tool while suppressing failures in the battery pack itself.

In view of the foregoing, it is an object of the present invention to provide a power tool capable of being used continuously without need to halt rotation of the motor, even when receiving a halt signal, such as an overdischarge detection signal or an overcurrent detection signal.

It is another object of the present invention to provide a battery pack and power tool that achieves maximum performance of the power tool while suppressing failures in the battery pack.

Solution to Problem

In order to attain above and other object, the present invention provides an power tool including a motor and control means for controlling the motor. The motor is capable of being driven by power supplied from a battery pack including a battery cell. The control means is configured to continue to rotate the motor even when a motor-halt signal is inputted from the battery pack.

According to the above configuration, the motor can be continuously driven even when receiving the halt signal from the battery pack. Accordingly, a period of time during the power tool is continuously usable can be lengthened.

Preferably, the control means is further configured to switch a control mode between a mode under which the control means halts the motor in response to the motor-halt signal and a mode under which the control means continues to rotate the motor irrespective of the motor-halt signal. With this configuration, a halting operation to the motor is appropriately performed.

Preferably, the battery pack includes battery protection means for monitoring a state of the battery cell. The battery protection means is configured to output the motor-halt signal when current flowing through the battery cell is continuously greater than or equal to a first prescribed value for a first prescribed period of time. The control means is further configured to halt the motor on the basis of the motor-halt signal when temperature of the battery cell is higher than a first predetermined value.

Preferably, the control means is further configured to: set an allowable current value and a current flow continuous period when the temperature of the battery cell is lower than the first predetermined value; and in a case where the temperature of the battery cell is low, set the allowable current value to a lower value than that in a case where the temperature of the battery cell is high and further set the current flow continuous period to a longer period than that in a case where the temperature of the battery cell is high, and halt the motor after expiration of the set current flow continuous period.

Another object of the present invention is to provide a power tool includes a motor, temperature detecting means for detecting temperature of the battery cell, and control means for controlling the motor. The motor is capable of being driven by power supplied from a battery pack including a battery cell. The control means is configured to continue to rotate the motor in response to a signal outputted from the battery temperature detecting means even when a motor-halt signal is inputted from the battery pack.

With this configuration, the motor can be continuously driven even when receiving the halt signal from the battery pack. Accordingly, a period of time during the power tool is continuously usable can be lengthened.

Preferably, the motor is halted in response to the motor-halt signal when the temperature of the battery cell is higher than a first predetermined value, whereas the motor continues to rotate irrespective of the motor-halt signal when the temperature of the battery cell is lower than or equal to the first predetermined value.

Preferably, an allowable current value and a current flow continuous period are set when the temperature of the battery cell is lower than the first predetermined value. In a case where the temperature of the battery cell is low, the allowable current value is set to a lower value than that in a case where the temperature of the battery cell is high and the current flow continuous period is set to a longer period than that in a case where the temperature of the battery cell is high. The motor is halted after expiration of the set current flow continuous period.

Still another object of the present invention is to provide a power tool includes a motor and control means for controlling the motor. The motor is capable of being driven by power supplied from a battery pack including a battery cell. The control means is configured to switch a control mode between a first mode and a second mode. Under the first mode, the control means halts the motor when a motor-halt signal is inputted from the battery pack. Under the second mode, the control means continues to rotate the motor even when the motor-halt signal is inputted from the battery pack.

In the above configuration, the motor can be continuously driven even when the power tool receives the halt signal from the battery pack. Accordingly, a period of time during the power tool is continuously usable can be lengthened.

Still another object of the present invention is to provide a battery pack connectable to a power tool. The battery pack includes at least one secondary battery cell. The power tool is capable of continuously performing a desired operation by virtue of discharge current supplied from the secondary battery cell. When the discharge current becomes large, a period of time during which the desired operation is allowed to be continuously performed is restricted.

In this configuration, when a desired operation that imposes a heavy load on the power tool and requires a large discharge current is performed, the battery pack can restrict the period of time during which the desired operation is allowed to be continuously performed (i.e., the allowable period for continuous operation), and therefore can allow the desired operation to be continuously performed for a set period. Accordingly, when comparing the battery pack with a conventional battery pack that halts discharge if the discharge current exceeds an overcurrent threshold, the battery pack can maximize the performance of the power tool while suppressing malfunctions in the battery pack.

Preferably, the period of time in a case where temperature of the secondary battery cell is high is shorter than that in a case where the temperature of the secondary battery is low.

With this configuration, the allowable period for continuous operation in a case where battery temperature is high is shorter than that in a case where the battery temperature is low. Accordingly, the allowable period for continuous operation can be shortened when there is heightened risk for failure in the secondary battery due to the high battery temperature, thereby maximizing the performance of the power tool while further suppressing malfunctions in the battery pack.

Preferably, the period of time in a case where the discharge current is large is shorter than that in a case where the discharge current is low.

In the above configuration, the allowable period for continuous operation in a case where the discharge current is large is shorter than that in a case where the discharge current is small. Accordingly, the allowable period for continuous operation can be shortened when there is heightened risk for failure in the secondary battery due to the large discharge current, thereby maximizing the performance of the power tool while further suppressing malfunctions in the battery pack.

Still another object of the present invention is to provide a battery pack connectable to a power tool. The battery pack includes at least one secondary battery cell. The power tool is capable of continuously performing a desired operation by virtue of discharge current supplied from the secondary battery cell. When the discharge current becomes large, a period of time during which the desired operation is allowed to be continuously performed is set. In a case where temperature of the secondary battery cell is high, the period of time is set to a shorter period than that in a case where the temperature of the secondary battery cell is low.

With this configuration, the operation can be continuously performed even when the discharge current is large. Although the allowable period for continuous discharge in case of high battery temperature is shorter than that in case of low battery temperature in order to suppress degradation of the secondary battery cell, the operation can be continued. Further, in case of the low battery temperature, the allowable period for continuous discharge can be further prolonged, thereby maximizing the performance of a power tool while suppressing malfunctions of the battery pack.

Still another object of the present invention is to provide a power tool to which a battery pack is connectable. The battery pack includes at least one secondary battery cell. The power tool is capable of continuously performing a desired operation by virtue of discharge current supplied from the secondary battery cell. When the discharge current becomes large, a period of time during which the desired operation is allowed to be continuously performed is restricted.

In the above configuration, when a desired operation that imposes a heavy load on the power tool and requires a large discharge current is performed, the period of time during which the desired operation is allowed to be continuously performed (i.e., the allowable period for continuous operation) can be restricted, and therefore the desired operation can be continuously performed for a set period, thereby maximizing the performance of the power tool while suppressing malfunctions in the battery pack.

Preferably, the period of time in a case where temperature of the secondary battery cell is high is shorter than that in a case where the temperature of the secondary battery is low.

Preferably, the period of time in a case where the discharge current is large is shorter than that in a case where the discharge current is low.

Still another object of the present invention is to provide a power tool to which a battery pack is connectable. The battery pack includes at least one secondary battery cell. The power tool is capable of continuously performing a desired operation by virtue of discharge current supplied from the secondary battery cell. When the discharge current becomes large, a period of time during which the desired operation is allowed to be continuously performed is set. In a case where temperature of the secondary battery cell is high, the period of time is set to a shorter period than that in a case where the temperature of the secondary battery cell is low.

With this configuration, the operation can be continuously performed even when the discharge current is large. Although the allowable period for continuous discharge in case of high battery temperature is shorter than that in case of low battery temperature in order to suppress degradation of the secondary battery cell, the operation can be continued. Further, in case of the low battery temperature, the allowable period for continuous discharge can be further prolonged, thereby maximizing the performance of a power tool while suppressing malfunctions of the battery pack.

Preferably, the power tool includes a motor and a switching element. The switching element is disposed between the motor and the secondary battery cell and configured to cut off a discharge current path therebetween after the period of time elapses.

Advantageous Effects of Invention

According to the power tool of the present invention, the motor can be continuously driven even when receiving the halt signal from the battery pack. Accordingly, a period of time during the power tool is continuously usable can be lengthened.

Further, according to the battery pack and the power tool of the present invention, the performance of the power tool can be maximized while suppressing malfunctions in the battery pack.

BRIEF DESCRIPTION OF DRAWINGS

FIG. 2 is a table illustrating conditions required for a battery protection circuit according to the first embodiment to output a halt signal.

FIG. 3 is a flowchart illustrating a motor halting process according to the first embodiment.

FIG. 4 is a graph illustrating a difference between battery cell temperature detected by thermistor and actual battery cell temperature.

FIG. 5 is a graph illustrating a method of calibrating the temperature detected by the thermistor.

FIG. 6 is a diagram illustrating an overcurrent determination table according to the first embodiment.

FIG. 7 is a graph illustrating the changes in output current with time during a conventional control.

FIG. 8 is a graph illustrating the changes in output current with time during the motor halting process of the first embodiment.

FIG. 18 is a schematic diagram illustrating the changes in discharge current with time during the discharge control performed by the battery pack according to the second embodiment in case where the battery temperature is the specific temperature and the discharge current is relatively small.

FIG. 19 is a schematic diagram illustrating the changes in discharge current with time during the discharge control performed by the battery pack according to the second embodiment in case where the discharge current is a specific value and the battery temperature is relatively low.

FIG. 20 is a schematic diagram illustrating the changes in discharge current with time during the discharge control performed by the battery pack according to the second embodiment in case where the discharge current is the specific value and the battery temperature is relatively high.

DESCRIPTION OF EMBODIMENTS

First Embodiment

Figure 1:
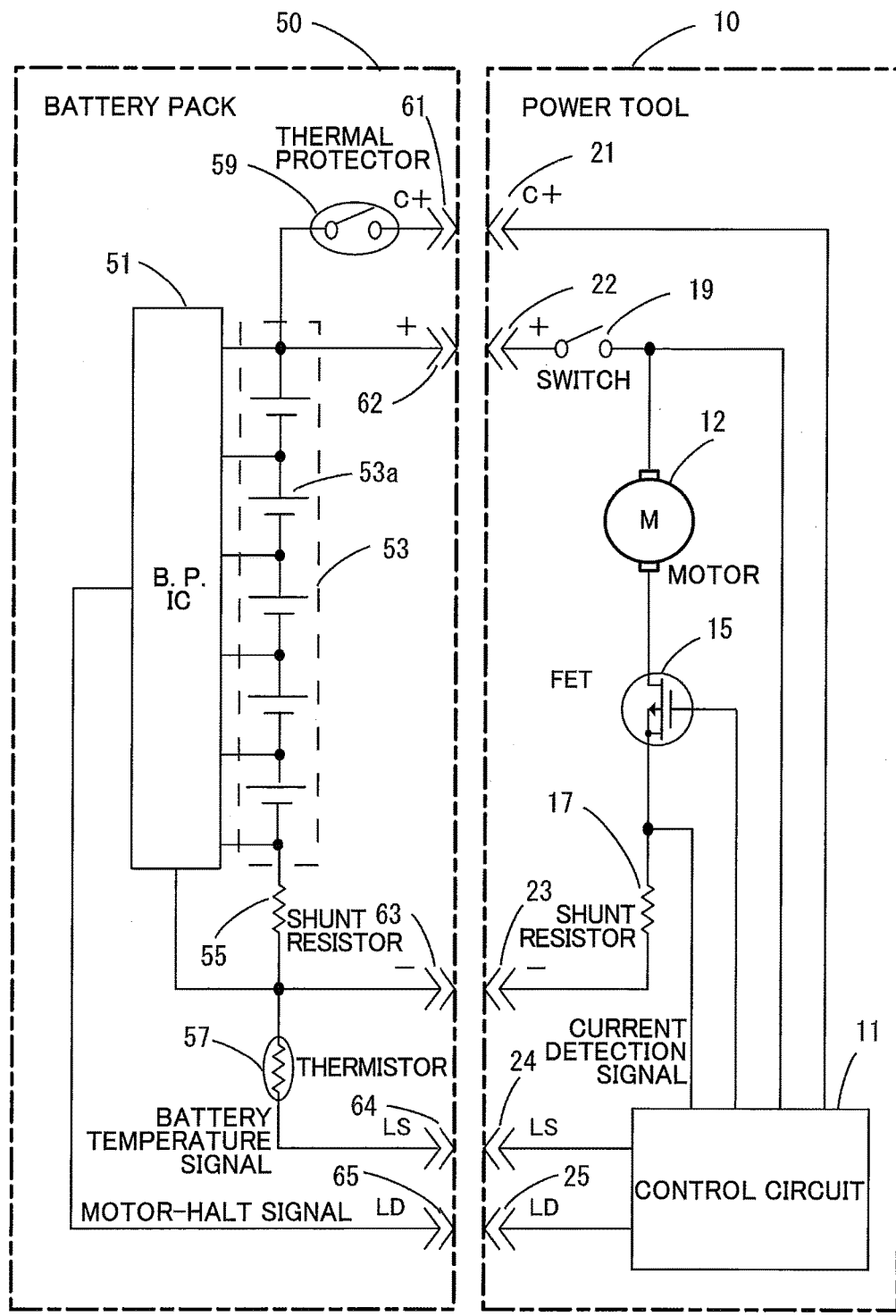
FIG. 1 is a circuit diagram illustrating circuits of a power tool and a battery pack according to a first embodiment of the present invention.

Next, a first embodiment of the present invention will be described while referring to the accompanying drawings. As shown in FIG. 1, a cordless power tool 10 (hereinafter simply called a "power tool 10") is connected to a rechargeable battery pack 50. The power tool 10 of the embodiment may be a circular saw or a planer, for example. The battery pack 50 includes a secondary battery 53, a battery protection IC 51, a current detection circuit 55, a thermistor 57, and a thermal protector 59. The battery pack 50 further includes a positive C terminal 61, a positive terminal 62, a negative terminal 63, a LS terminal 64, and a LD terminal 65. The positive C terminal 61 is connected to the thermal protector 59. Power is supplied from the secondary battery 53 to the power tool 10 through the positive terminal 62 and negative terminal 63. The LS terminal 64 is connected to the thermistor 57. The LD terminal 65 is connected to the battery protection IC 51.

The secondary battery 53 has a plurality of battery cells 53a. In the example of FIG. 1, five battery cells 53a are all connected in series. The present invention may be applied to any type of secondary battery and is not limited to any specific type. In the present embodiment, lithium-ion batteries will be described as an example of the battery cells 53a. Also the number of battery cells 53a and their connected configuration are not limited to the example in the present embodiment. For example, the battery cells 53a may be connected in parallel. In the present embodiment, each battery cell 53a has a rated voltage of 3.6 V. Hence, the overall secondary battery 53 has a rated voltage of 18 V.

The current detection circuit 55 is disposed between the negative side of the secondary battery 53 and the negative terminal 63 and detects electric current outputted from the secondary battery 53. More specifically, the current detection circuit 55 has a shunt resistor and outputs the voltage drop across the shunt resistor to the battery protection IC 51.

When the output current based on the detection results of the current detection circuit 55 is greater than or equal to a prescribed value, the battery protection IC 51 determines that the output current is an overcurrent and outputs a motor-halt signal (hereinafter simply called a "halt signal") to the LD terminal 65. The battery protection IC 51 also detects the voltage of each battery cell 53a and outputs a halt signal to the LD terminal 65 when even one of the battery cells 53a is brought into an overcharge or overdischarge state.

FIG. 2 is a table showing conditions required for the battery protection IC 51 to output a halt signal in the present embodiment. When the current detected by the current detection circuit 55 is 75 A or greater for a continuous period of 0.5 seconds, the battery protection IC 51 determines that an overcurrent occurs and outputs a halt signal. Further, when even one of the battery cells 53a has a voltage output of 2.0 V or less, the battery protection IC 51 determines that an overdischarge occurs and outputs a halt signal.

The thermistor 57 is connected between the LS terminal 64 and the negative side of the secondary battery 53. The thermistor 57 is disposed near the secondary battery 53 and detects the temperature of the same.

The thermal protector 59 is connected between the positive side of the secondary battery 53 and the positive C terminal 61. The thermal protector 59 is also disposed near the secondary battery 53. If the temperature of the thermal protector 59 rises to a predetermined level (85° C., for example) or higher, the thermal protector 59 opens to cut off the current path connecting the secondary battery 53 and positive C terminal 61.

The power tool 10 includes a control circuit 11, a motor 12, a shutdown circuit 15, a current detection circuit 17, and a trigger switch 19. The power tool 10 also includes a positive C terminal 21, a positive terminal 22, a negative terminal 23, a LS terminal 24, and a LD terminal 25. These terminals are respectively connected to the positive C terminal 61, positive terminal 62, negative terminal 63, LS terminal 64, and LD terminal 65 of the battery pack 50. These terminals correspond to the connecting means of the present invention. The control circuit 11 and shutdown circuit 15 respectively correspond to the controlling means and interrupting means, while terminals 21-25 correspond to the connecting means.

The battery pack 50 supplies power to the motor 12 via the positive terminal 22 and negative terminal 23. The motor 12 is rotated by the power supplied from the battery pack 50. The trigger switch 19 is provided between the positive terminal 62 and the motor 12 for switching the motor 12 from start to stop and vice versa.

The positive terminal 22 is connected to the control circuit 11 via the trigger switch 19. With this connection, when the power tool 10 is connected to the battery pack 50 and the trigger switch 19 is on, the control circuit 11 can measure the voltage across the secondary battery 53.

The shutdown circuit 15 includes a field effect transistor (FET) that is disposed between the motor 12 and negative terminal 23. By turning the FET off, the shutdown circuit 15 interrupts the supply of power to the motor 12, thereby switching the motor 12 between a rotating state and a stop state.

The trigger switch 19 is operated by the user of the power tool 10. The positive terminal 22 and motor 12 are electrically connected to each other when the user switches the trigger switch 19 on, while the positive terminal 22 and motor 12 are electrically disconnected from each other when the user switches the trigger switch 19 off. In this way, the rotation of the motor 12 can be switched between start and stop.

The current detection circuit 17 includes a shunt resistor. The control circuit 11 detects the value of current flowing in the current detection circuit 17 (shunt resistor).

The control circuit 11 is a microcontroller. The control circuit 11 is connected to the positive C terminal 21, LS terminal 24, and LD terminal 25. The control circuit 11 detects the voltage across the thermistor 57 via the LS terminal 24 to measure the thermistor temperature (temperature of the secondary battery 53).

The control circuit 11 can switch off the shutdown circuit 15 upon receiving a halt signal via the LD terminal 25.

The control circuit 11 measures the voltage value applied to the positive C terminal 21. If the voltage value is greater than or equal to a prescribed voltage value, the control circuit 11 determines that the thermal protector 59 is on. If the voltage value is less than the prescribed voltage value, the control circuit 11 determines that the thermal protector 59 is off (open).

The control circuit 11 possesses memory (not shown) for temporarily storing data and the like in various processes. The control circuit 11 also stores an overcurrent determination table (see FIG. 6). As will be described later, the overcurrent determination table includes, for each of calibrated temperature Tc ranges, each of correlation between a calibrated temperature Tc (estimated temperature of the secondary battery 53), an electric current value, and a continuous period. The control circuit 11 also stores a program for implementing a motor halting process.

Next, the motor halting process according to the present embodiment will be described with reference to FIG. 3. Note that although the control circuit 11 executes this motor halting process, the control circuit 11 remains in a state capable of receiving a halt signal from the LD terminal 25 throughout this process. Hence, when a halt signal is outputted from the battery protection IC 51, the control circuit 11 receives the halt signal while executing the motor halting process and stores this halt signal in its memory. When a halt signal is received in the present embodiment, the control circuit 11 does not instantly halt the motor 12 without exception, but rather references the halt signal in S27 and S29 of the motor halting process described later to determine whether to halt the motor 12.

Further, while executing the motor halting process, the control circuit 11 stores the relationship between electric current detected by the current detection circuit 17 and elapsed time. For example, the control circuit 11 may store the current detected by the current detection circuit 17 at prescribed intervals (every 0.1 seconds, for example).

In S1 the operator switches on the trigger switch 19, causing the motor 12 to begin rotating. In S3 the control circuit 11 determines whether the thermal protector 59 is open. That is, the control circuit 11 measures the voltage applied to the positive C terminal 21. If this voltage value is greater than or equal to a predetermined voltage value, the control circuit 11 determines that the thermal protector 59 is on (in a closed state). If the voltage value is less than the predetermined voltage value, the control circuit 11 determines that the thermal protector 59 is off (in an open state).

If the thermal protector 59 is open in S3 (S3: YES), in S29 the control circuit 11 determines whether a halt signal has been received from the battery protection IC 51 via the LD terminal 25. If a halt signal has been received (S29: YES), in S31 the control circuit 11 outputs an off signal to the gate of the FET 15 (turns the FET 15 off), interrupting the path of electric current between the motor 12 and negative terminal 23. Interrupting the flow of current halts the motor 12. When the thermal protector 59 is open, the temperature of the secondary battery 53 is greater than a predetermined temperature (85° C., for example). In this case, the control circuit 11 halts the motor 12 in accordance with the halt signal.

If the thermal protector 59 is not open (i.e., if the temperature of the secondary battery 53 is lower than the predetermined temperature) in S3 (S3: NO), in S5 the control circuit 11 specifies the present temperature detected by the thermistor 57 (battery temperature detection circuit) via the LS terminal 24 and stores this temperature as a first temperature.

In S7 the control circuit 11 determines whether the first temperature is higher than 80° C. If the first temperature is higher than 80° C. (S7: YES), the process advances to S29 described above. In other words, the control circuit 11 turns off (shuts down) the FET 15 to halt the motor 12 when the first temperature is greater than 80° C. and a halt signal is received from the battery protection IC 51.

If the first temperature is not greater than 80° C. (S7: NO), in S9 the control circuit 11 determines whether a prescribed time (5 seconds, for example) has elapsed since the first temperature was detected. If the prescribed time has not elapsed (S9: NO), the control circuit 11 continues to wait. When the prescribed time has elapsed (S9: YES), in S11 the control circuit 11 specifies the present temperature detected by the thermistor 57 via the LS terminal 24 and stores this temperature as a second temperature.

In S13 the control circuit 11 calculates a temperature gradient B from the first temperature and second temperature according to equation (1) below.

$$B = DT/Dt \quad (1)$$

Here, DT=second temperature−first temperature, and Dt is the prescribed time (5 seconds) in S9.

In S15 the control circuit 11 estimates the actual temperature of the secondary battery 53 (battery cells 53a) using the second temperature and the temperature gradient B. This estimated temperature is defined as the calibrated temperature Tc. The calibrated temperature Tc is calculated according to the following equation (2).

$$Tc = \text{second temperature} + B \times \alpha \quad (2)$$

Here, α is a constant and is set to an optimal value by measuring the actual temperature of the secondary battery 53.

The temperature indicated by the thermistor 57 differs from the actual temperature of the secondary battery 53. One factor for this difference is that the outer case of the thermistor 57 and the like delays heat transfer from the secondary battery 53.

FIG. 4 is a graph showing the difference between the temperature of the secondary battery 53 and the temperature indicated by the thermistor 57. The solid line denotes the actual temperature of the secondary battery 53 (battery cell temperature) while the dashed line denotes the temperature indicated by the thermistor 57 (the thermistor measured temperature). The thermistor measured temperature is a curve that is shifted to the right of the battery cell temperature in the direction of elapsed time. In other words, the thermistor measured temperature is delayed from the battery cell temperature. Put another way, the thermistor measured temperature indicates a lower value than the battery cell temperature when the battery cell temperature is rising. In the present embodiment, equation (2) is used to calibrate the thermistor temperature in order to calculate the calibrated temperature Tc. Through this calibration, it is possible to obtain a calibrated temperature Tc that is more accurate and closer to the actual battery cell temperature than the thermistor temperature.

FIG. 5 is a graph depicting the same battery cell temperature and thermistor measured temperature shown in FIG. 4. As shown in FIG. 5, the control circuit 11 measures a first temperature T0 and a second temperature T1 at timings t1 and t2, respectively, and calculates the calibrated temperature Tc from the difference between the first temperature T0 and the second temperature T1. Timing t2 is a prescribed time (5 seconds in the present embodiment) after timing t1.

In S17 the control circuit 11 selects a current value and a continuous period corresponding to the calculated calibrated temperature Tc from the overcurrent determination table.

As shown in FIG. 6, the overcurrent determination table depicts correlations between calibrated temperatures, current values, and continuous periods. The calibrated temperatures are divided into ranges including the range of 55° C. or lower and intervals of 5° C. between 55° C. and 80° C.

Specifically, if the calibrated temperature is no greater than 55° C., the selected current value is 100 A and the selected continuous period is 10 seconds. If the calibrated temperature is greater than 55° C. but no greater than 60° C., the selected current value is 100 A and the selected continuous period is 7 seconds. If the calibrated temperature is greater than 60° C. but no greater than 65° C., the selected current value is 95 A and the selected continuous period is 5 seconds. If the calibrated temperature is greater than 65° C. but no greater than 70° C., the selected current value is 90 A and the selected continuous period is 3 seconds. If the calibrated temperature is greater than 70° C. but no greater than 75° C., the selected current value is 85 A and the selected continuous period is 2 seconds. If the calibrated temperature is greater than 75° C. but no greater than 80° C., the selected current value is 80 A and the selected continuous period is 1 second.

The control circuit 11 specifies, from the overcurrent determination table, the temperature range that corresponds to the calibrated temperature Tc calculated above and selects the current value and continuous period corresponding to this temperature range. In the following description, the current value and the continuous period selected from the table will be called the selected current value and selected continuous period, respectively.

In S19 the control circuit 11 measures the present current value using the current detection circuit 17 (shunt resistor). As described above, the control circuit 11 stores correlations between the current detected by the current detection circuit 17 and the time of detection throughout the motor halting process. In S19 the control circuit 11 specifies the present current value using the current detection circuit 17 and references the overcurrent determination table.

In S21 the control circuit 11 determines on the basis of the detection results from the current detection circuit 17 whether the detected current has been in a continuous state greater than the selected current value for a period longer than the selected continuous period. Here, the meaning of the detected current being in a continuous state greater than the selected current value denotes that, once the detected current became greater than or equal to the selected current value, the detected current has remained continuously above the selected current value without once falling below the selected current value. However, if the detected current falls below the selected current value for just a short time (0.2 seconds, for example), the detected current may be considered to have remained continuously in a state greater than or equal to the selected current value. This is because Step S21 is performed to determine whether output of power from the secondary battery 53 is no longer advisable due to the high load on the secondary battery 53 and the phenomenon that the current value falls below the selected current value for only a short time does not lessen the load on the secondary battery 53.

If the control circuit 11 determines in S21 that the overcurrent determination condition has been met (S21: YES), the process advances to S31 and the motor 12 is halted. When the overcurrent determination condition is met in S21, the control circuit 11 halts the motor 12 without determining in S29 whether a halt signal was received from the battery protection IC 51. This is because, by calculating the calibrated temperature Tc, it is possible to find the temperature of the secondary battery 53 with high precision and, therefore, it is possible to control power output from the secondary battery 53 appropriately.

On the other hand, assuming that a control is performed without calibration of the thermistor measured temperature shown in FIGS. 4 and 5, there is a high possibility that the temperature indicated by the thermistor 57 is delayed from the actual temperature (and specifically lower than the actual temperature). In such a case, it would be necessary to provide a safety margin in the current value and continuous period when the control is performed. In contrast, in the present embodiment, since the calculation of the calibrated temperature Tc is performed, such safety margin need not be provided and power which the secondary battery 53 can output can be accurately controlled. Specifically, the control circuit 11 can increase the output current and lengthen the continuous period in accordance with the calibrated temperature Tc while referencing the overcurrent determination table. As shown in FIG. 2, the battery protection IC 51 outputs a halt signal when the output current is in a state of 75 A or greater for a duration of 0.5 seconds or greater. On the other hand, when using the overcurrent determination table in FIG. 6, a current of 80 A can be supplied continuously for 1 second in the temperature range greater than 75° C. and no greater than 80° C. Hence, the control circuit 11 receives a halt signal from the battery protection IC 51 before determining in S21 whether the overcurrent determination condition is met. However, in the present embodiment, even if the control circuit 11 has received a halt signal from the battery protection IC 51, the control circuit 11 does not halt the motor 12 until determining in S21 that the overcurrent determination condition is met. In this way, the control circuit 11 can extract the maximum amount of power from the secondary battery 53. Note that cases in which the control circuit 11 halts the motor 12 in response to a halt signal from the battery protection IC 51 correspond to the first mode of the present invention, while cases in which the control circuit 11 does not halt the motor 12 (continues rotating the motor 12), even when a halt signal has been received from the battery protection IC 51, correspond to the second mode of the present invention.

When the control circuit 11 determines in S21 that the overcurrent determination condition was met (S21: NO), in S23 the control circuit 11 detects the voltage applied to the positive terminal 22. In S25 the control circuit 11 determines whether the voltage detected in S23 is less than a prescribed voltage value (12 V, for example). That is, the control circuit 11 determines whether there is a possibility that the secondary battery 53 is in an overdischarge state. If the detected voltage is greater than or equal to the prescribed voltage value, the control circuit 11 determines that there is no possibility the secondary battery 53 is in an overdischarge state, and the process returns to S3.

However, if the detected voltage is less than the prescribed voltage value, in S27 the control circuit 11 determines whether a halt signal has been received from the battery protection IC 51. If a halt signal has been received (S27: YES), in S31 the control circuit 11 halts the motor 12.

However, if a halt signal has not been received (S27: NO), the process returns to S3. Note that the battery protection IC 51 detects the voltage for each cell and determines whether any of the cells are in an overdischarge state, while in S25 the control circuit 11 determines the overall voltage value of the secondary battery 53. Thus, the battery protection IC 51 can more accurately determine overdischarge. Accordingly, if a halt signal has not been received, the control circuit 11 determines that no battery cell 53a is in an overdischarge state, even though a positive determination was made in S25, and therefore does not halt the motor.

In the process described above, steps S9-S21 correspond to the second mode, while steps S27 and S29 correspond to the first mode. Further, steps S7 and S9 correspond to the status detecting means.

With the structure of the power tool 10 according to the present embodiment, the control circuit 11 continues to supply power to the motor 12 as long as a positive determination is not reached in S21, even if the control circuit 11 receives a halt signal from the battery protection IC 51. FIG. 7 is a graph showing the change in electric current over time during a conventional control for halting the motor 12 on the basis of a halt signal. As shown in FIG. 2, the battery protection IC 51 outputs a halt signal when a current of 75 A or greater is outputted continuously for 0.5 seconds. Therefore, in the conventional control method, the control circuit 11 halts the motor 12 after power of 75 A or greater has been outputted and then 0.5 seconds has elapsed. Here, the battery protection IC 51 outputs a halt signal without taking the temperature of the secondary battery 53 into consideration. In other words, if a current of 75 A or greater continues for 0.5 seconds, the motor 12 is halted without exception irrespective of the temperature of the secondary battery 53.

FIG. 8 is a graph showing the changes in electric current over time during the motor halting process of the present embodiment. Here, the calibrated temperature during the process shown in FIG. 8 is 55° C. or less. As in the conventional process, the battery protection IC 51 outputs a halt signal when a current of 75 A is continuously outputted for 0.5 seconds. However, in the present embodiment, the control circuit 11 does not perform the determination in S29 since a negative determination is made in S7. Further, since a negative determination is also made in S21 at this stage, the output of power from the secondary battery 53 is maintained. If the current subsequently rises to 100 A, the current value becomes in a state greater than or equal to 100 A that corresponds to the temperature range of 55° C. or less depicted in the overcurrent determination table of FIG. 6. Therefore, the control circuit 11 halts the motor 12 when the current has remained in a continuous state of 100 A or greater for 10 seconds.

When comparing FIGS. 7 and 8, power is outputted considerably longer in the present embodiment than the conventional control. This is because the conventional process does not account for the temperature of the secondary battery 53 and, as a result, must include a considerably large safety margin for outputting power. In contrast, in the present embodiment the control circuit 11 considers the calibrated temperature Tc obtained by estimating the temperature of the secondary battery 53 and selects a current value and continuous period corresponding to this calibrated temperature Tc. Accordingly, in the present embodiment, power can be continuously outputted within a range where a large load is not imposed on the secondary battery 53. In this way, the operating time of the power tool 10 can be lengthened and the maximum output of the power tool 10 can be increased.

The control circuit 11 halts the motor 12 when the battery temperature reaches 80° C. or greater (S7: YES) and when the control circuit 11 has received a halt signal. Thus, when the temperature becomes high, the switching to the control based on the halt signal can be performed. Accordingly, an unnecessarily large load on the secondary battery 53 can be suppressed.

The control circuit 11 also halts the motor 12 when determining in S25 that the battery voltage has fallen below the prescribed voltage value (S25: YES) and in S27 that a halt signal has been received (S27: YES). If a positive determination is made in S27, it can be judged that a halt signal was outputted due to one or more of the battery cells 53a in the secondary battery 53 being in an overdischarge state. In such a case, the control circuit 11 also halts the motor 12 in response to the halt signal. By this control, the motor 12 is reliably halted when a battery cell 53a is in an overdischarge state.

However, when a negative determination is made in S25, even if the battery protection IC 51 outputs a halt signal, it is considered that this halt signal is outputted because the battery protection IC 51 has detected an overcurrent state. In this case, the control circuit 11 maintains rotation of the motor 12 without performing the determination in S27. In other words, the control circuit 11 ignores the halt signal when a negative determination is made in S25. This is because the determination in S21 is a replacement for the overcurrent determination in the present embodiment. By using step S21 for the overcurrent determination as described above, it is possible to lengthen the drive time of the motor 12.

While the invention has been described in detail with reference to the first embodiment thereof, it would be apparent to those skilled in the art that various changes and modifications may be made therein without departing from the scope of the invention.

For example, after calculating the calibrated temperature Tc in S15, the control circuit 11 may determine whether the calibrated temperature Tc is greater than 80° C., as described in S7. In this case, if the calibrated temperature Tc is greater than 80° C., the process advances to the determination in S29. In this way, the control circuit 11 can halt output from the secondary battery 53 within a safer range.

The calibrated temperature Tc may be obtained according to a method other than equation (1). For example, the constant α may be varied according to the driving time of the motor 12.

Alternatively, the current value detected by the current detection circuit 17 and the voltage value applied to the positive terminal 22 may be detected at prescribed intervals, and the temperature of the secondary battery 53 may be estimated on the basis of these detection results and the temperature of the secondary battery 53 before the motor 12 began rotating. The temperature estimated according to this method may be used as the calibrated temperature Tc.

In the embodiment described above, the control circuit 11 performs the control based on a halt signal in S29 when determining in S3 that the thermal protector 59 is open, or when determining in S7 that the battery temperature is greater than 80° C. Further, the control circuit 11 performs the control based on the halt signal in S27 when determining in S25 that the battery voltage is less than 12 V. However, the control circuit 11 may perform the control based on a halt signal in other cases, as well. For example, the control circuit 11 may monitor the rotational speed of the motor 12 and may perform the control based on the halt signal when the rotational speed is less than a prescribed value. If the rotational speed of the motor 12 drops below the prescribed value, the motor 12 can be considered to be in a locked state and therefore the current flowing through the motor 12 can be judged to have become large. Thus, by performing the control based on the halt signal when the rotational speed of the motor 12 is less than the prescribed value, the motor 12 can be reliably halted.

Second Embodiment

Figure 9:
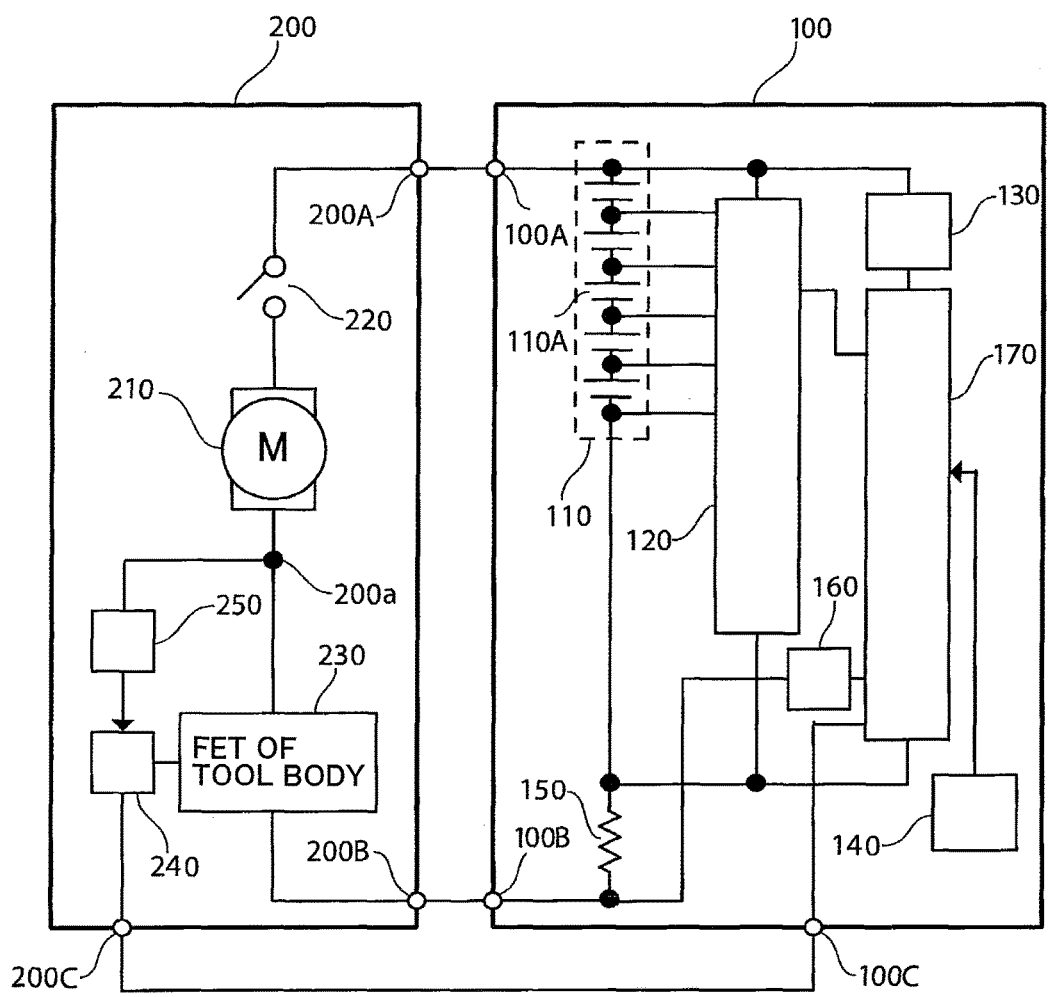
FIG. 9 is a circuit block diagram illustrating configurations of a battery pack and a power tool according to a second embodiment.

Next, a battery pack 100 and a power tool 200 according to a second embodiment of the present invention will be described with reference to FIGS. 9 through 20. FIG. 9 is a circuit block diagram showing the configurations of the battery pack 100 and power tool 200 in a state where the battery pack 100 and power tool 200 are connected to each other. The battery pack 100 serves as a driving power source for driving the power tool 200 in a state where the battery pack 100 and power tool 200 are connected to each other. In this state, the power tool 200 can be driven using the battery pack 100 as the driving power source.

As shown in FIG. 9, the battery pack 100 includes a positive discharge terminal 100A, a negative discharge terminal 100B, a signal output terminal 100C, a cell-connected battery 110, a battery protection IC 120, a power supply circuit 130, a temperature measuring circuit 140, a shunt resistor 150, a current measuring circuit 160, and a microcomputer 170.

The positive discharge terminal 100A, negative discharge terminal 100B, and signal output terminal 100C are configured to connect to prescribed terminals on the power tool 200 when the battery pack 100 and power tool 200 are in the connected state. The positive discharge terminal 100A and negative discharge terminal 100B are terminals for supplying power from the cell-connected battery 110 to the power tool 200. The signal output terminal 100C is connected to the microcomputer 170 for outputting to the power tool 200 various signals outputted from the microcomputer 170. The electrical path connecting the positive discharge terminal 100A and the negative discharge terminal 100B functions as a power supply electrical path.

The cell-connected battery 110 is accommodated in a casing (not shown) of the battery pack 100 and includes a set of five battery cells 110A connected in series. In the present embodiment, the battery cells 110A are rechargeable lithium-ion batteries, for example. The positive terminal of the battery cell 110A having the highest potential in the cell-connected battery 110 is connected to the positive discharge terminal 100A. The negative terminal of the battery cell 110A having the lowest potential in the cell-connected battery 110 is connected to the negative discharge terminal 100B via the shunt resistor 150. The battery cell 110A is an example of the secondary battery cell.

The battery protection IC 120 is an integrated circuit that individually monitors the voltage of each battery cell 110A in the cell-connected battery 110. The battery protection IC 120 determines that an overcharge state has occurred when the voltage of a battery cell 110A (voltage of a single cell)

exceeds an overcharge threshold and determines that an overdischarge state has occurred when the voltage of a battery cell 110A is less than or equal to an overdischarge threshold. When determining that an overcharge or overdischarge state has occurred in even one of the battery cells 110A, the battery protection IC 120 outputs a signal to the microcomputer 170 indicating the overcharge or overdischarge state.

The power supply circuit 130 is a constant-voltage power supply circuit including a voltage regulator and the like. The power supply circuit 130 converts and stabilizes voltage of the cell-connected battery 110 and outputs the resultant voltage to the microcomputer 170.

The temperature measuring circuit 140 measures the battery temperature of the battery cells 110A and outputs the measured battery temperature to the microcomputer 170. The temperature measuring circuit 140 includes mainly a thermistor and a voltage converting circuit. The thermistor is disposed near the battery cells 110A and is capable of measuring the battery temperature of the battery cells 110A. The voltage converting circuit converts the resistance value of the thermistor to voltage and outputs this voltage to the microcomputer 170 as a signal indicating the battery temperature of the battery cells 110A. The temperature measuring circuit 140 functions as the measuring means.

The shunt resistor 150 is a resistor used for measuring discharge current. The shunt resistor 150 is connected between the cell-connected battery 110 and negative discharge terminal 100B.

The current measuring circuit 160 measures the discharge current and outputs the value of the measured current to the microcomputer 170. The current measuring circuit 160 measures the voltage drop produced by discharge current flowing through the shunt resistor 150, converts the measured voltage drop value to voltage and outputs this voltage to the microcomputer 170 as a signal indicating the value of the discharge current. The current measuring circuit 160 functions as the measuring means and the current measuring means.

The microcomputer 170 primarily includes a ROM, an arithmetic section, a RAM, a timekeeping function, an A/D input port, and an output port. The microcomputer 170 controls the supply of power from the battery pack 100 to the power tool 200, i.e., performs discharge control. The ROM is a nonvolatile storage area that stores various programs, various thresholds, tables, and the like that are used for discharge control. The arithmetic section performs arithmetic processes on various signals inputted into the A/D input port on the basis of a discharge process program, and outputs processing results from the output port. The RAM is a volatile storage area that temporarily stores data used when the CPU performs arithmetic processes. The timekeeping function is a function for measuring time. The timekeeping function measures elapsed time while the cell-connected battery 110 is discharging (discharge period), and other elapsed times required for the discharge control. The microcomputer 170 functions as the measuring means, the period measuring means, and the discharge halting means.

The A/D input port includes a plurality of ports that are connected to the battery protection IC 120, temperature measuring circuit 140, and current measuring circuit 160. The battery protection IC 120 outputs to the port connected thereto signals indicating an overcharge state or overdischarge state. The temperature measuring circuit 140 outputs to the port connected thereto signals indicating the battery temperature. The current measuring circuit 160 outputs to the port connected thereto signals indicating the value of the discharge current. The output port of the microcomputer 170 is connected to the signal output terminal 100C and outputs prescribed signals to the power tool 200 on the basis of results of arithmetic processes performed by the arithmetic section according to process programs. These signals include an FET ON signal for turning an FET 230 (described later) on and an FET OFF signal for turning the FET 230 off. The discharge control performed by the microcomputer 170 will be described later. The FET OFF signal is an example of the halt signal.

Next, the power tool 200 will be described. As shown in FIG. 9, the power tool 200 primarily includes a positive input terminal 200A, a negative input terminal 200B, a signal input terminal 200C, a motor 210, a trigger switch 220, the FET 230, an FET control unit 240, and a holding circuit 250. The power tool 200 has the general structure of a conventional power tool that includes a housing, a gear mechanism, and an output unit (not shown) in addition to the structure described above. When the motor 210 is driven to rotate with the battery pack 100 serving as the driving power source, the power tool 200 can perform a desired operation for processing a workpiece, such as fastening, cutting, polishing/sanding, and grinding. The power tool 200 may be a circular saw, a disc grinder, or an impact drill, for example.

When the power tool 200 and battery pack 100 are connected to each other, the positive input terminal 200A, negative input terminal 200B, and signal input terminal 200C are respectively connected to the positive discharge terminal 100A, negative discharge terminal 100B, and signal output terminal 100C of the battery pack 100.

One terminal of the motor 210 is connected to the positive input terminal 200A via the trigger switch 220, while the other terminal is connected to the negative input terminal 200B via the FET 230. When the power tool 200 and battery pack 100 are connected together and the trigger switch 220 and FET 230 are both in an ON state, power is supplied to the motor 210 from the battery pack 100, so that the motor 210 begins rotating. When the motor 210 is driven to rotate, the motor 210 begins driving an output part (not shown), enabling the power tool 200 to process a workpiece.

The trigger switch 220 is a switch operated by the user. When the trigger switch 220 is in an ON state, the motor 210 and positive input terminal 200A are electrically connected to each other (an electrical connection state). When the trigger switch 220 is in an OFF state, the motor 210 and positive input terminal 200A are electrically disconnected from each other (an electrical disconnection state).

The FET 230 is a switching element for interrupting current flowing to the motor 210. The FET 230 is in an ON state when a prescribed voltage is applied to the gate of the FET 230. The FET 230 is in an OFF state when the gate is connected to ground. In the ON state, the FET 230 electrically connects the motor 210 and negative input terminal 200B. In the OFF state, the FET 230 electrically disconnects the motor 210 from negative input terminal 200B.

The FET control unit 240 controls the FET 230 and is connected to the signal input terminal 200C. The FET control unit 240 controls the FET 230 on the basis of signals outputted from the microcomputer 170 via the signal input terminal 200C. The FET 230 and FET control unit 240 function as the drive halting means.

When the FET 230 is bought into an OFF state while the power tool 200 is being driven (while the trigger switch 220 is in the ON state), the holding circuit 250 holds the OFF state of the FET 230 irrespective of the operations of the FET control unit 240. As an example, the FET 230 is switched to an OFF state upon a signal received from the battery pack 100 while the power tool 200 is being driven, halting the drive of the power tool 200. However, the user may continue to hold the trigger switch 220 in an ON state after the power tool 200 is halted. In such cases, the holding circuit 250 holds the halted state of the power tool 200, preventing the power tool 200 from returning suddenly to a driving state.

The holding circuit 250 includes a plurality of FETs, transistors, and the like. The holding circuit 250 is connected to a junction point 200a between the motor 210 and FET 230. When the trigger switch 220 is in an ON state and the FET 230 is switched to an OFF state, the holding circuit 250 holds the OFF state of the FET 230 by connecting the gate of the FET 230 to ground using the potential of the junction point 200a. Here, the potential of the junction point 200a is approximately 0 V when the trigger switch 220 is in an ON state and the FET 230 is in an ON state. On the other hand, the potential of the junction point 200a is the voltage of the cell-connected battery 110 when the trigger switch 220 is in an ON state and the FET 230 is in an OFF state.

Figure 10:
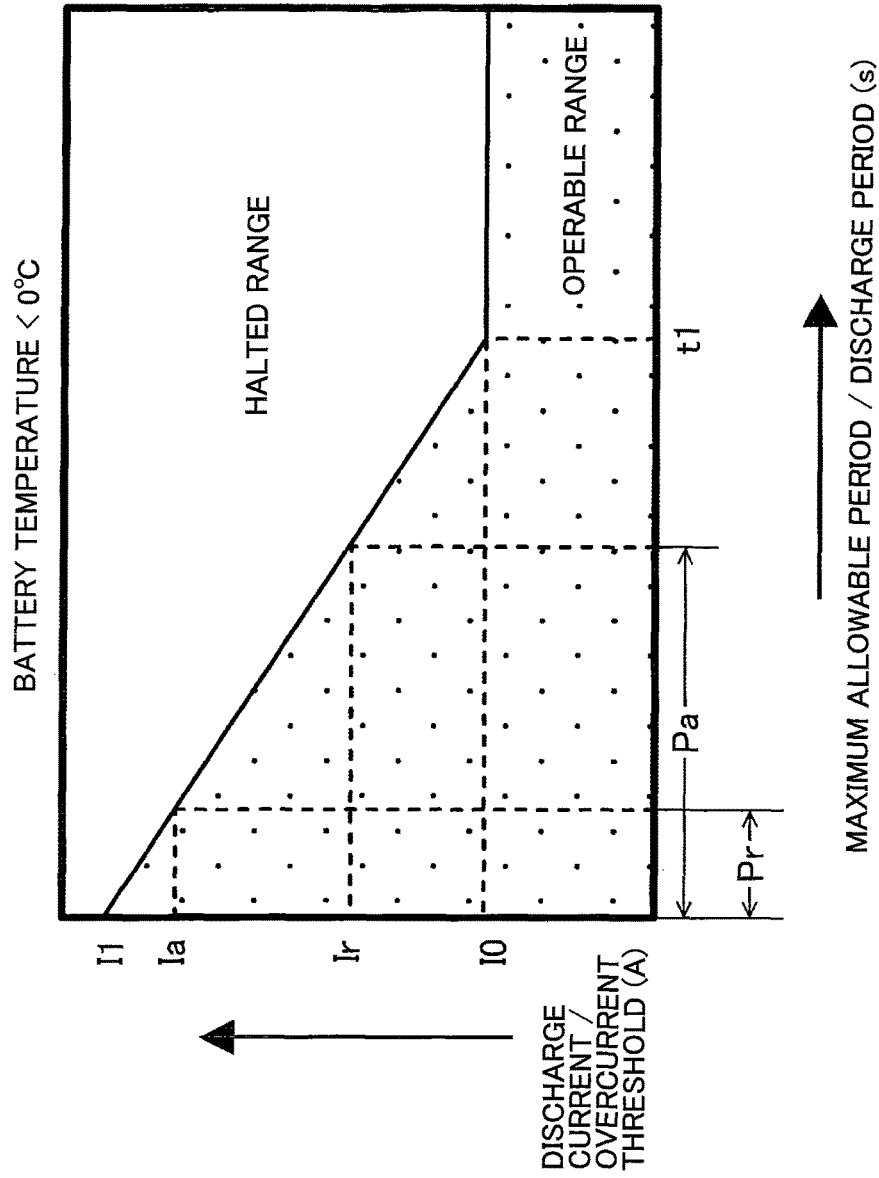
FIG. 10 is a diagram illustrating a maximum allowable period and an overcurrent threshold when the battery temperature is in a first temperature range.

Next, discharge control performed by the microcomputer 170 of the battery pack 100 according to the second embodiment will be described with reference to FIGS. 10 and 20.

The battery pack 100 according to the second embodiment performs discharge control designed to maximize performance of the power tool while preventing malfunctions in the battery pack due to overcurrent. The risk of failure in a battery pack from overcurrent tends to increase as the battery temperature rises. Therefore, the microcomputer 170 of the present embodiment measures the discharge period under a prescribed condition, sets a maximum allowable period for the discharge period and an overcurrent threshold for the discharge current on the basis of the battery temperature, and halts discharge when the discharge period exceeds the maximum allowable period or when the discharge current exceeds the overcurrent threshold. The maximum allowable period is an example of the allowable period.

More specifically, the overcurrent threshold is set higher when the discharge period is shorter, and the overcurrent threshold is set lower as the discharge period is prolonged. Further, the overcurrent threshold is set lower as the battery temperature increases. In other words, the maximum allowable period is set longer when the discharge current is smaller, set shorter as the discharge current is larger, and set shorter as the battery temperature increases.

Further, the battery pack 100 can be used without any particular likelihood of failure when a relatively small discharge current flows continuously for a long period (hereinafter called a discharge current suitable for continuous use). In this case, the microcomputer 170 need not measure the discharge period or set a restriction for the discharge period. Further, the microcomputer 170 sets a threshold defining the upper limit of the discharge current suitable for continuous use (a threshold I0 described later) and begins measuring the discharge period when the discharge current exceeds this threshold.

Figure 11:
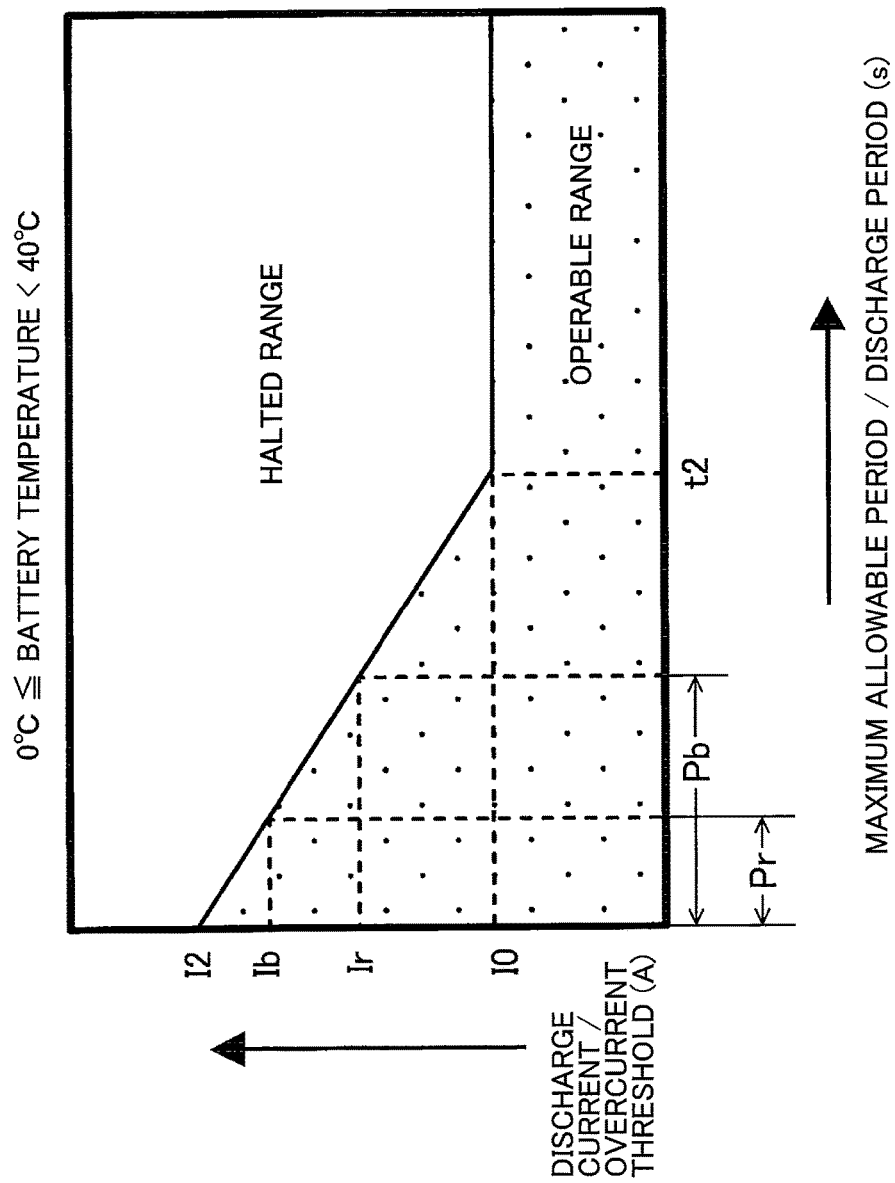
FIG. 11 is a diagram illustrating the maximum allowable period and the overcurrent threshold when the battery temperature is in a second temperature range.
Figure 12:
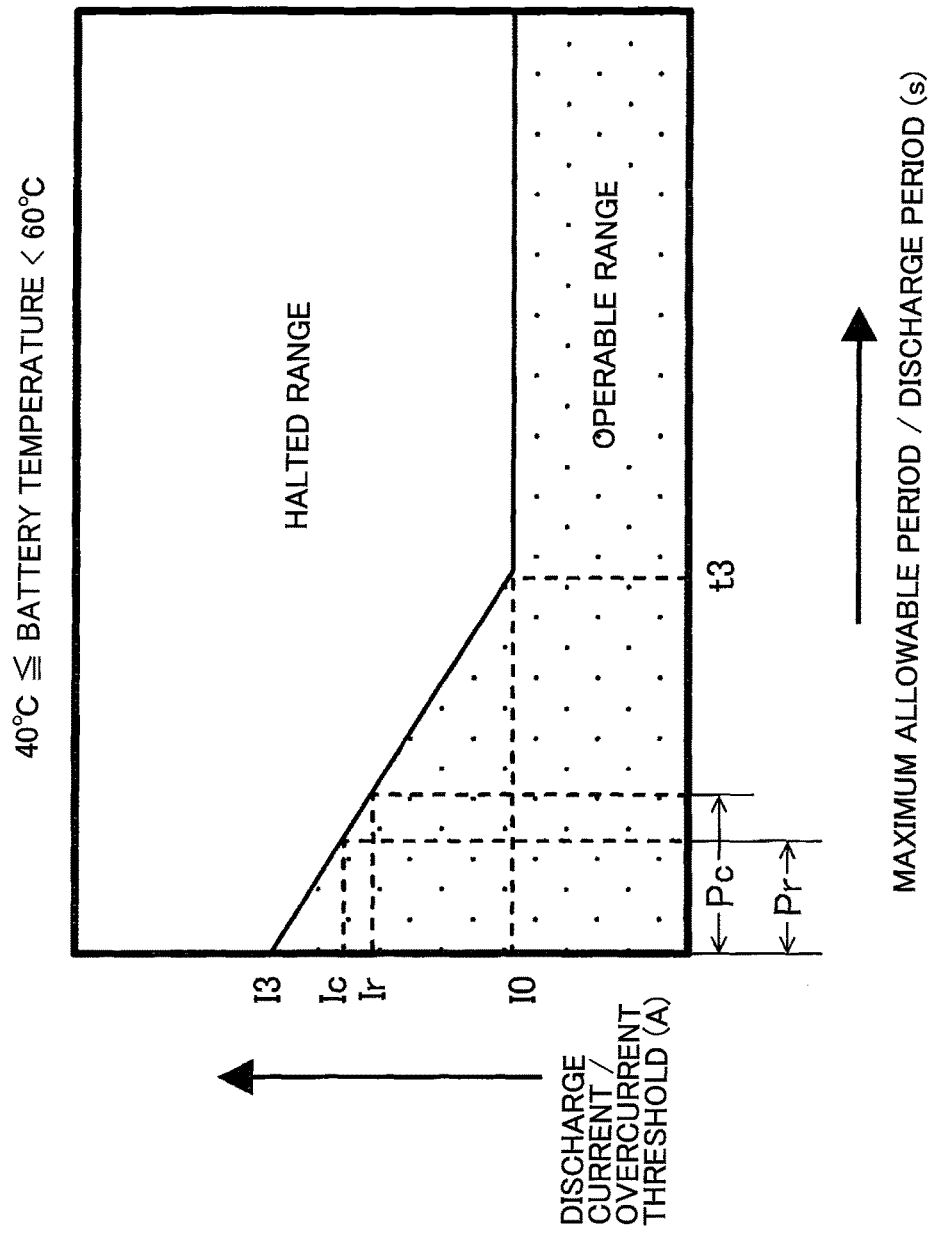
FIG. 12 is a diagram illustrating the maximum allowable period and the overcurrent threshold when the battery temperature is in a third temperature range.
Figure 13:
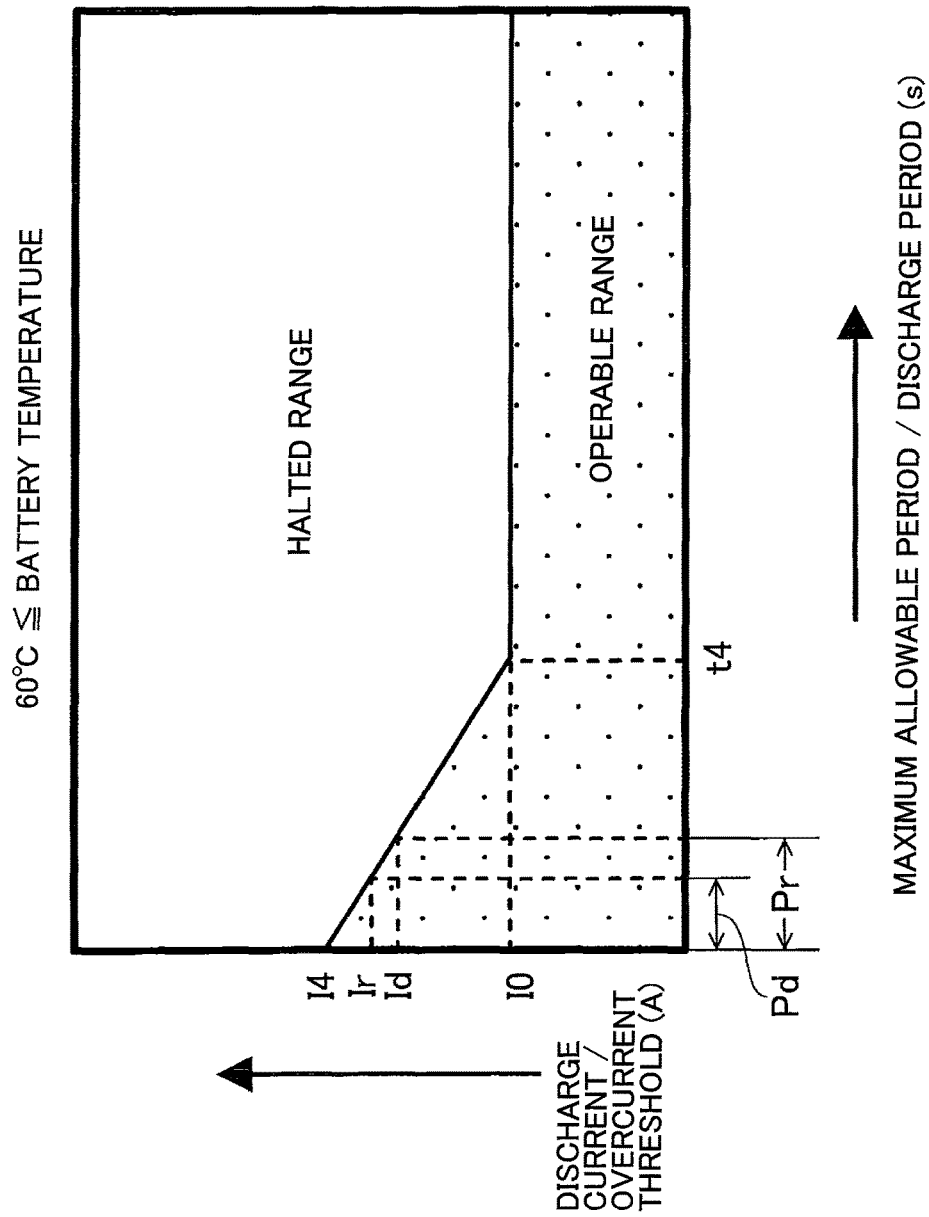
FIG. 13 is a diagram illustrating the maximum allowable period and the overcurrent threshold when the battery temperature is in a fourth temperature range.

Next, the maximum allowable period and overcurrent threshold will be described with reference to FIGS. 10 through 13. FIGS. 10 through 13 show the maximum allowable periods and overcurrent thresholds for different battery temperatures. FIG. 10 shows values used when the battery temperature is below 0° C. (the first temperature range). FIG. 11 shows values used when the battery temperature is at least 0° C. and below 40° C. (the second temperature range). FIG. 12 shows values used when the battery temperature is at least 40° C. and below 60° C. (the third temperature range). FIG. 13 shows values used when the battery temperature is at least 60° C. (the fourth temperature range). The solid line depicted in each drawing denotes the overcurrent threshold that is changed according to the measured discharge period or, from a different perspective, denotes the maximum allowable period that is changed according to the discharge current. I0 in the drawings denotes the threshold defining the upper limit of the discharge current suitable for continuous use. The threshold I0 is an example of the prescribed current value.

As shown in FIGS. 10 through 13, the maximum allowable period is set to a shorter period as the discharge current increases, assuming that the battery temperature is uniform.

Further, the maximum allowable period is set to a shorter period as the battery temperature increases, assuming that the discharge current is fixed. More specifically, assume that Ta is a battery temperature in the first temperature range, Tb is a battery temperature in the second temperature range, Tc is a battery temperature in the third temperature range, and Td is a battery temperature in the fourth temperature range. If comparing maximum allowable periods for the same discharge current Ir, the maximum allowable period is Pa for battery temperature Ta, Pb for battery temperature Tb, Pc for battery temperature Tc, and Pd for battery temperature Td, where the relationship Pa>Pb>Pc>Pd is satisfied. Note also that timings t1, t2, t3, and t4 in the drawings satisfy the relationship t1>t2>t3>t4.

As shown in FIGS. 10 through 13, the overcurrent threshold is set to smaller values as the discharge period lengthens, assuming that battery temperature is fixed.

The overcurrent threshold is also set to smaller values as the battery temperature rises, assuming that the discharge period is fixed. When comparing overcurrent thresholds for the same discharge period Pr, the overcurrent threshold is Ia for battery temperature Ta, Ib for battery temperature Tb, Ic for calibrated temperature Tc, and Id for battery temperature Td, where the relationship Ia>Ib>Ic>Id is satisfied. Note that I1, I2, I3, and I4 in the drawings denote the maximum overcurrent threshold for each temperature range and satisfy the relationship I1>I2>I3>I4.

When setting the maximum allowable period or overcurrent threshold as described above, the shaded regions in FIGS. 10 through 13 are defined as an operable range in which the power tool 200 can be driven, while the unshaded regions are defined as a halted range in which the driving of the power tool 200 is halted.

Relationships between discharge currents and maximum allowable periods and relationships between discharge periods and overcurrent thresholds for each temperature range described above are stored in ROM of the microcomputer 170. These relationships may be expressed in relational expressions between discharge currents and maximum allowable periods and relational expressions between discharge periods and overcurrent thresholds, or as a table correlating discharge currents and maximum allowable periods and a table correlating discharge periods and overcurrent thresholds. When the relationships are expressed as tables, the microcomputer 170 may calculate numerical values not provided in the tables through interpolation.

Figure 14:
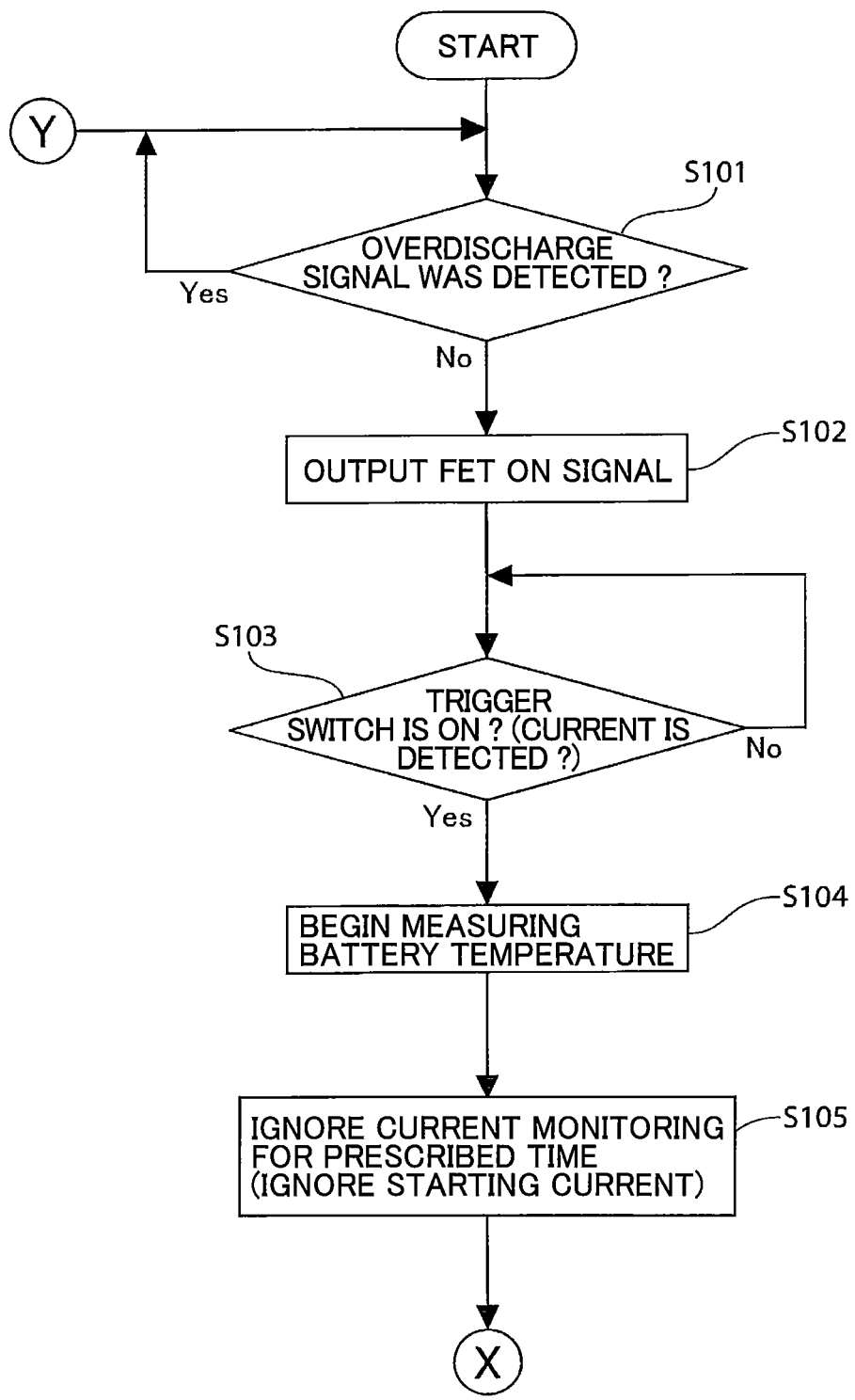
FIG. 14 is a part of a flowchart illustrating discharge control performed by the battery pack according to the second embodiment.
Figure 15:
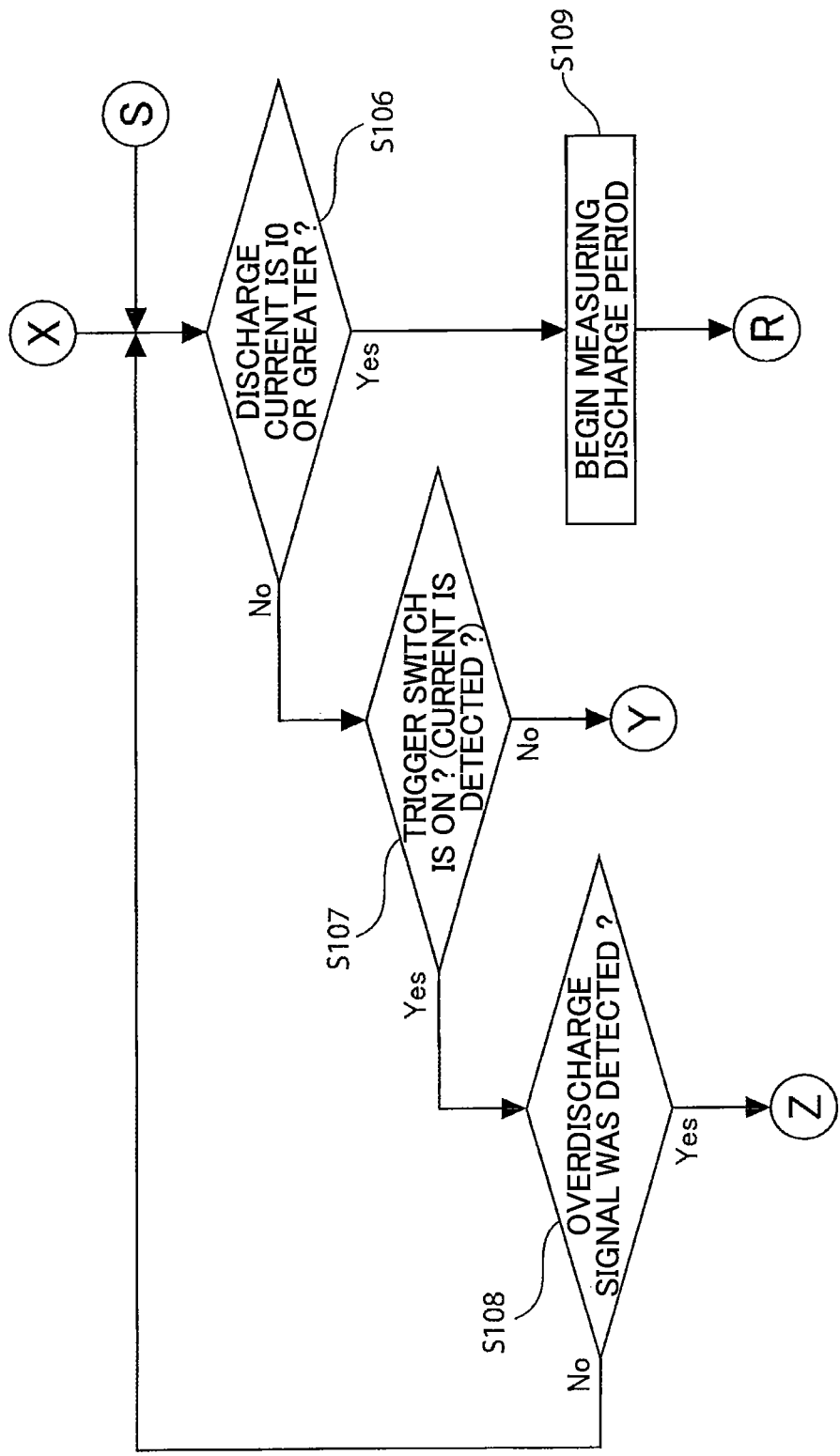
FIG. 15 is a part of the flowchart illustrating the discharge control performed by the battery pack according to the second embodiment.
Figure 16:
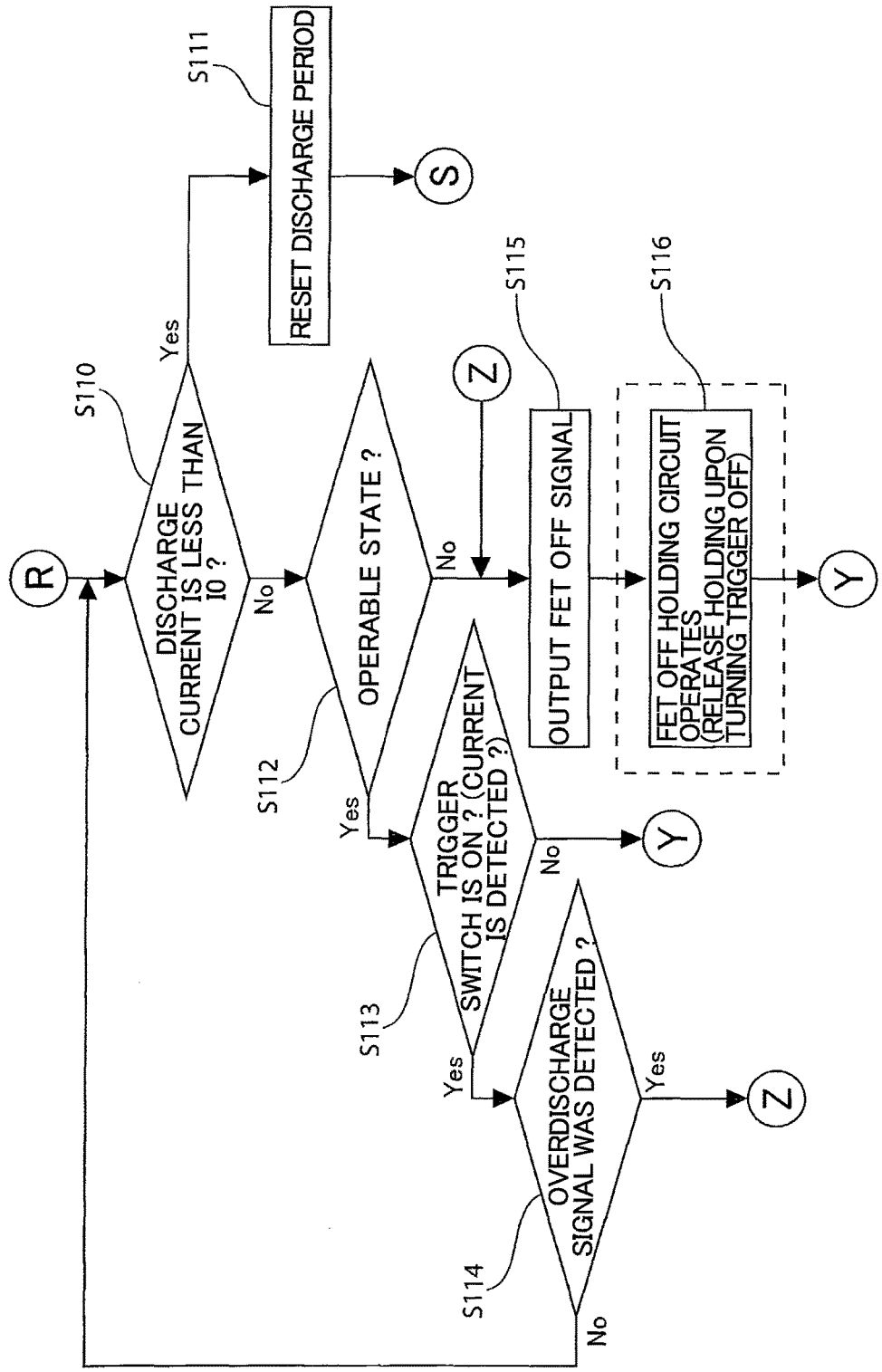
FIG. 16 is a part of the flowchart illustrating the discharge control performed by the battery pack according to the second embodiment.

FIGS. 14 through 16 are flowcharts showing an example of discharge control performed by the battery pack 100.

In S101 at the beginning of the discharge control process, the microcomputer 170 of the battery pack 100 determines whether an overdischarge signal was detected. The microcomputer 170 makes this determination by determining whether the battery protection IC 120 outputted a signal to the microcomputer 170 indicating an overdischarge state.

If an overdischarge signal was detected (S101: YES), the microcomputer 170 repeats the determination in S101 until an overdischarge signal is no longer detected, i.e., the microcomputer 170 does not drive the power tool 200 while an overdischarge signal is detected. When an overdischarge signal is not detected (S101: NO), in S102 the microcomputer 170 outputs an FET ON signal to the power tool 200 for turning the FET 230 on.

The microcomputer 170 outputs the FET ON signal from its output port to the FET control unit 240 via the signal output terminal 100C and signal input terminal 200C. Upon receiving the FET ON signal outputted from the microcomputer 170, the FET control unit 240 outputs a voltage signal to the gate of the FET 230 to switch the FET 230 to an ON state.

After the FET 230 is switched to an ON state, in S103 the microcomputer 170 determines whether the trigger switch 220 of the power tool 200 is in an ON state, i.e., whether the user has operated the trigger switch 220 to begin driving of the power tool 200. The microcomputer 170 determines whether the trigger switch 220 is in an ON state on the basis of whether the current measuring circuit 160 has detected a discharge current flowing through the shunt resistor 150. That is, the microcomputer 170 determines that a discharge current is flowing when the current measuring circuit 160 inputs a signal into the A/D input port of the microcomputer 170 indicating the value of the discharge current.

When the trigger switch 220 is not in an ON state (S103: NO), the microcomputer 170 repeats the determination in S103 and waits until the trigger switch 220 is in an ON state. Once the trigger switch 220 is in an ON state, i.e., when the power tool 200 begins driving and the cell-connected battery 110 begins discharging (S103: YES), in S104 the microcomputer 170 begins measuring the battery temperature of the battery cells 110A. Here, the temperature measuring circuit 140 outputs a signal indicating the battery temperature to the microcomputer 170, thereby performing the measurement of the battery temperature.

In S105 the microcomputer 170 excludes the starting current from the measurements. As described above, the battery pack 100 according to the second embodiment measures its discharge current and controls electrical discharge, i.e., controls the drive of the power tool 200. However, a starting current flows for only a very short time after starting the power tool 200 and is therefore excluded from measurements. The microcomputer 170 excludes the starting current from measurements by performing a process that treats the signal received from the current measuring circuit 160 as invalid until a prescribed time has elapsed after the microcomputer 170 determined in S103 that the trigger switch 220 was in an ON state. Note that the processes in S103 and S105 are performed almost simultaneously.

After the prescribed time has elapsed in S105, in S106 of FIG. 15 the microcomputer 170 determines whether the discharge current is greater than or equal to the threshold I0. The microcomputer 170 makes this determination by comparing the value of the discharge current measured by the current measuring circuit 160 with the threshold I0. Here, the value of the discharge current measured by the current measuring circuit 160 is the average current over a prescribed interval.

If the microcomputer 170 determines that the discharge current is less than the threshold I0 (S106: NO), in S107 the microcomputer 170 determines whether the trigger switch 220 is in an ON state. The microcomputer 170 makes this determination according to the same method described in S103.

When the microcomputer 170 determines that the trigger switch 220 is not an ON state, i.e., when the user has stopped driving the power tool 200 (S107: NO), the process returns to S101, i.e., the drive of the power tool 200 is halted and the power tool 200 returns to its initial state. Note that when the power tool 200 returns to its initial state, the microcomputer 170 resets the discharge period, regardless of whether measurements have begun for the discharge period. On the other hand, if the trigger switch 220 is in an ON state (S107: YES), in S108 the microcomputer 170 determines whether an overdischarge signal was detected. The microcomputer 170 makes this determination according to the same method used in S101.

If the microcomputer 170 determines that an overdischarge signal was detected (S108: YES), in S115 of FIG. 16 the microcomputer 170 outputs an FET OFF signal to the FET control unit 240 to switch the FET 230 to its OFF state, interrupting the discharge current. After the FET 230 is switched to the OFF state, discharge from the cell-connected battery 110 of the battery pack 100 and driving of the power tool 200 are simultaneously stopped. Once the FET 230 has been switched to the OFF state, in S116 the holding circuit 250 maintains the halted state of the power tool 200 so that the power tool 200 does not suddenly switch to the driving state from the halted state while the user continues to hold the trigger switch 220 in the ON state. After the trigger switch 220 has been switched to the OFF state, the process returns to S101.

However, if the microcomputer 170 determines in S108 that an overdischarge signal has not been detected (S108: NO), the process returns to S106 and the microcomputer 170 again determines whether the discharge current is greater than or equal to the threshold I0. Thus, the microcomputer 170 repeats the process from S106 to S108 to continue driving the power tool 200 while the discharge current is less than the threshold I0, the trigger switch 220 is in an ON state, and an overdischarge signal is not detected.

However, if the microcomputer 170 determines in S106 that the discharge current is greater than or equal to the threshold I0 (S106: YES), in S109 the microcomputer 170 begins measuring the discharge period. Here, the microcomputer 170 uses its timekeeping function to measure elapsed time of the discharge period. Next, in S110 of FIG. 16, the microcomputer 170 determines whether the discharge current has dropped below the threshold I0 while measuring the discharge period.

If the microcomputer 170 determines that the discharge current is less than the threshold I0 (S110: YES), in S111 the microcomputer 170 resets the measured discharge period and returns to S106. The significance of resetting the discharge period is that the battery pack 100 is judged not to be in a condition for which failure is particularly likely to occur, even if the discharge current that is below the threshold I0 flows continuously. Note that, the determination in S110 may be made on the basis of whether the discharge current is continuously less than the threshold I0 for a predetermined period. With this method, the microcomputer 170 can exclude cases in which the discharge current momentarily falls below the threshold I0, and thereby more accurately determine that the battery pack 100 is not likely to fail.

When the microcomputer 170 determines that the discharge current is greater than or equal to the threshold I0 (S110: NO), in S112 the microcomputer 170 determines whether the battery pack 100 is in an operable state on the basis of the measured results. For determining whether the battery pack 100 is in an operable state, the microcomputer 170 first extracts the appropriate relationship between discharge current and maximum allowable period from among the relationships shown in FIGS. 10 through 13 on the basis of the present battery temperature, and then references the extracted relationship to specify the maximum allowable period corresponding to the present discharge current. Next, the microcomputer 170 determines whether the present discharge period exceeds the specified maximum allowable period. Alternatively, the microcomputer 170 may extract the appropriate relationship between discharge period and overcurrent threshold from among the relationships shown in FIGS. 10 through 13 on the basis of the present battery temperature, reference the extracted relationship to specify the overcurrent threshold corresponding to the present discharge period, and determine whether the present discharge current exceeds the specified overcurrent threshold.

If the microcomputer 170 determines that the battery pack 100 is in an operable state (S112: YES), in S113 the microcomputer 170 determines whether the trigger switch 220 is in an ON state. The microcomputer 170 performs this determination according to the same method described for S103.

If the microcomputer 170 determines that the trigger switch 220 is in an OFF state, i.e., when the user has stopped driving the power tool 200 (S113: NO), the process returns to S101. In other words, driving of the power tool 200 is stopped and the power tool 200 is returned to its initial state. However, if the trigger switch 220 is in an ON state (S113: YES), in S114 the microcomputer 170 determines whether an overdischarge signal has been detected. This determination is performed according to the same method described in S101.

If the microcomputer 170 determines that an overdischarge signal was detected (S114: YES), the microcomputer 170 performs the process in S115 and S116 described above, halting the power tool 200 and returning the power tool 200 to its initial state.

However, if the microcomputer 170 determines in S114 that an overdischarge signal was not detected (S114: NO), the process returns to S110 and the microcomputer 170 again determines whether the discharge current is less than the threshold I0. Hence, the microcomputer 170 repeatedly performs the process in S110 through S114 to continue driving the power tool 200 while the discharge current is greater than or equal to the threshold I0, the battery pack 100 is in an operable state, the trigger switch 220 is in an ON state, and an overdischarge signal is not detected.

If the microcomputer 170 determines in S112 that the battery pack 100 is not in an operable state (S112: NO), the microcomputer 170 performs the process in S115 and S116 described above, halting the power tool 200 and returning the power tool 200 to its initial state.

Next, the discharge current and discharge period when the power tool 200 is driven using discharge control according to the battery pack 100 will be described with reference to FIGS. 17 through 20. FIGS. 17 through 20 are schematic diagrams representing the change in discharge current over time when discharge control is performed by the battery pack 100.

Figure 17:
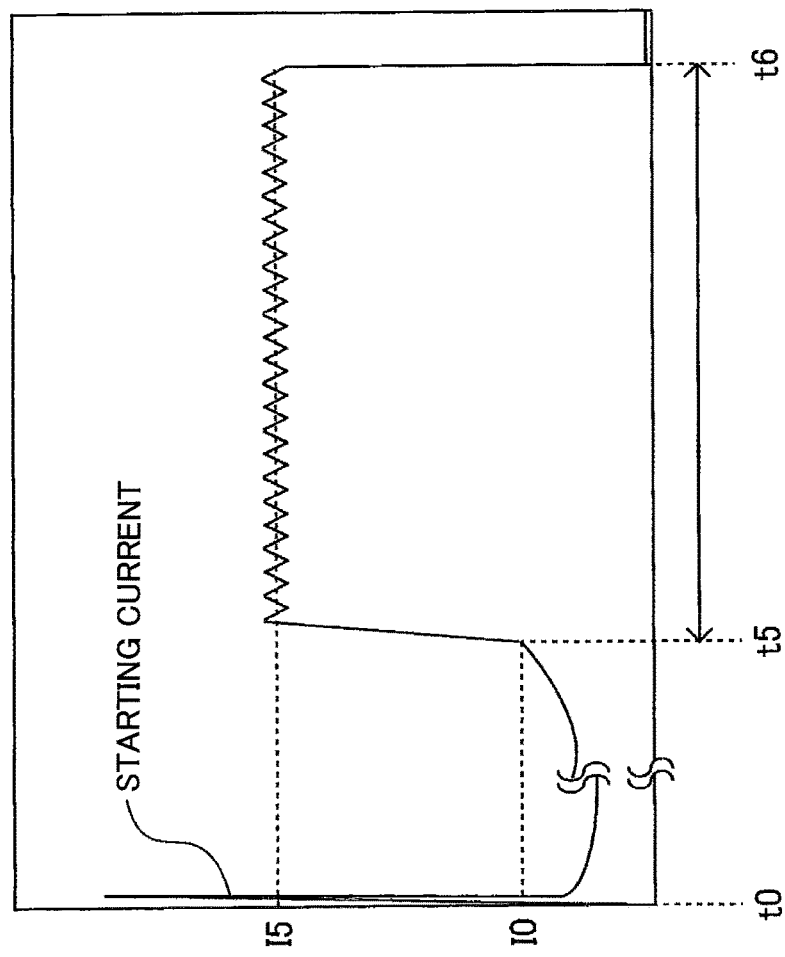
FIG. 17 is a schematic diagram illustrating the changes in discharge current with time during the discharge control performed by the battery pack according to the second embodiment in case where the battery temperature is a specific temperature and the discharge current is relatively large.

FIGS. 17 and 18 show the changes in discharge current over time when using a different discharge current while the battery temperature is in the same temperature range. Note that the discharge currents I5 in FIGS. 17 and I6 in FIG. 18 indicate the average discharge current and satisfy the relationship I5>I6.

As shown in FIGS. 17 and 18, the power tool 200 is driven beginning from timing t0 (corresponding to S103), and the microcomputer 170 begins measuring the discharge period at timing t5 (corresponding to S109) for both cases in which the discharge current is I5 and I6. For discharge current I5, the microcomputer 170 subsequently determines at timing t6 that the battery pack 100 is no longer in an operable state (corresponding to S112) and stops driving the power tool 200 (halts discharge). For discharge current I6, the microcomputer 170 determines at timing t7 (later than timing t6) that the battery pack 100 is no longer in an operable state (corresponding to S112) and stops driving the power tool 200.

Thus, in the case of the smaller discharge current I6, the battery pack 100 can drive the power tool 200 continuously for a longer time than the case of the larger discharge current I5. Stated differently, in the case of the discharge current I6 where the discharge period is longer than that in the case of discharge current I5, the microcomputer 170 can perform discharge control using a smaller overcurrent threshold than that in the case of the discharge current I5. In this way, the maximum allowable periods shown in FIGS. 10 through 13 are set in order to perform control such that the power tool 200 is driven longer when the discharge current is relatively small and use of the power tool 200 can be restricted to prevent malfunction of the battery pack when the discharge current is relatively large.

FIGS. 19 and 20 show changes in the discharge current over time for a battery temperature in different temperature ranges while using the same discharge current. I7 in FIGS. 19 and 20 denotes the average discharge current, and the temperature range in FIG. 19 is a lower range than the temperature range in FIG. 20.

As shown in FIGS. 19 and 20, the microcomputer 170 begins driving the power tool 200 at timing t0 (corresponding to S103) and begins measuring the discharge period at timing t8 (corresponding to S109) for both temperature ranges different from each other. In the case of FIG. 19, the microcomputer 170 subsequently determines at timing t9 that the battery pack 100 is no longer in an operable state (corresponding to S112) and stops driving the power tool 200 (halts discharge). In the case of FIG. 20, the microcomputer 170 determines at timing t10 (earlier than timing t9) that the battery pack 100 is no longer in an operable state (corresponding to S112) and stops driving the power tool 200.

Thus, in the case of FIG. 20 where the temperature range is the higher range than that in the case of FIG. 11, the drive duration of the power tool 200 is shorter (the discharge period is shorter) than that in the case of FIG. 19. In this way, the overcurrent thresholds and maximum allowable periods shown in FIGS. 10 through 13 are set in order to perform control such that use of the power tool 200 can be limited taking into consideration the fact that risk of malfunction of the battery pack is higher when the battery temperature is high. Stated differently, the overcurrent thresholds and maximum allowable periods shown in FIGS. 10 through 13 are set such that heavy load operations can be performed within a range that will not cause malfunction of the battery pack.

Note that a slight amount of discharge current flows for driving the microcomputer 170 and the like even after the power tool 200 is halted in each of the scenarios in FIGS. 17 through 20. However, a state in which a minute amount of discharge current flows is no different from a state in which discharge is halted in the present embodiment. In other words, the halted state of discharge in the present specification denotes a state in which discharge current does not flow for driving the power tool 200.

As described above, the battery pack 100 according to the present embodiment is configured to, when the discharge current becomes large, restrict the period of time during which desired operations can be continuously performed. Accordingly, when a desired operation that imposes a heavy load on the power tool 200 and requires a large discharge current is performed, the battery pack 100 can restrict the allowable period for continuous operations and therefore can allow the desired operation to be performed continuously for a set period. Hence, when comparing the battery pack 100 with a conventional battery pack that halts discharge if the discharge current exceeds an overcurrent threshold, the battery pack 100 according to the present embodiment can extend the allowable period for continuous operations, thereby maximizing the performance of the power tool while suppressing malfunctions in the battery pack.

Further, the battery pack 100 is configured to, when the battery temperature of the battery cells 110A is high, set the allowable period for continuously performing a desired operation to a shorter period than that when the battery temperature of the battery cells 110A is low, thereby enabling the power tool 200 to continuously perform the operation even when the discharge current is large. Conventional power tools and battery packs are configured to halt operations even when the discharge current exceeding the overcurrent threshold flows for a very short time, but this very short time is too short to perform an operation. That is, unlike the principles of the present invention aimed at extending the length of the allowable period for continuous operations, the conventional battery pack and power tool are configured to halt operations immediately when an overcurrent occurs, preventing the user from continuing operations. The battery pack 100 according to the present embodiment, on the other hand, allows the user to continue operations but uses a discharge time (discharge period) that is shorter when the battery temperature is high than when the battery temperature is low in order to avoid degradation of the battery cells 110A. In this way, the battery pack 100 can maximize the performance of a power tool while suppressing failure in the battery pack.

As described above, the battery pack 100 according to the present embodiment includes the microcomputer 170 that halts discharge when the discharge period exceeds the maximum allowable period and modifies this maximum allowable period on the basis of measurement results. Hence, the battery pack 100 can set the maximum allowable period to a suitable period on the basis of the load imposed on the power tool. In the conventional battery pack control, for example, discharge is immediately halted when the power tool is operating under a heavy load that causes the discharge current in the battery pack to become relatively high. In contrast, even when a heavy load is imposed on the power tool, the battery pack 100 can set the maximum allowable period for discharge on the basis of the amount of the load on the power tool. Accordingly, the power tool is not immediately halted when the power tool is under heavy load, but can be used for a certain length of time. On the other hand, the maximum allowable period can be set to a sufficiently long period when the load on the power tool is light. Hence, the battery pack 100 can maximize performance of the power tool 200 within a range that will not cause failure in the battery pack 100.

Further, the maximum allowable period becomes shorter as the battery temperature rises while the discharge current is constant. Hence, the present invention can shorten the discharge period to suppress failure in the battery pack while there is heightened risk for such failure due to the relatively high battery temperature, and can lengthen the discharge period to maximize performance of the power tool when there is low risk of failure in the battery pack 100 owing to the relatively low battery temperature.

Further, the maximum allowable period becomes shorter as the discharge current increases while the battery temperature is constant. Hence, the present invention can shorten the discharge period to suppress failure in the battery pack while there is heightened risk for such failure due to the relatively large discharge current, and can lengthen the discharge period to maximize performance of the power tool 200 when there is low risk of failure in the battery pack 100 owing to the relatively small discharge current.

The battery pack 100 of the present invention begins measuring the discharge period at the point that the discharge current exceeds a prescribed current value. Accordingly, the power tool can be used without restriction as long as the discharge current does not exceed this prescribed current value when the prescribed current value is set to a value at which failure is not particularly likely to occur in the battery pack 100. Consequently, the present invention can improve workability.

The battery pack 100 according to the present embodiment is provided with the microcomputer 170 for halting discharge when the discharge current exceeds the overcurrent threshold, and the overcurrent threshold is varied on the basis of results of measurements. Therefore, the microcomputer 170 can set the overcurrent threshold to a suitable value based on the load applied to the power tool. In the conventional control process for a battery pack, discharge is immediately halted when the power tool is under heavy load that causes the discharge current in the battery pack to become relatively large. In contrast, even when a heavy load is imposed on the power tool, the battery pack 100 can set an overcurrent threshold on the basis of the load applied to the power tool. Accordingly, the power tool is not immediately halted when the load becomes heavy and can be used until the discharge current in the battery pack 100 becomes relatively large. Accordingly, the present invention can maximize performance of the power tool 200 while avoiding failure in the battery pack 100.

The overcurrent threshold becomes smaller as the battery temperature rises while the discharge period is constant. Hence, the present invention can lower the overcurrent threshold to suppress failure in the battery pack while there is heightened risk for such failure due to the relatively high battery temperature, and can raise the overcurrent threshold to maximize performance of the power tool 200 when there is low risk of failure in the battery pack 100 owing to the relatively low battery temperature.

Further, the overcurrent threshold is lowered as the discharge period grows longer while the battery temperature is constant. Hence, the present invention can lower the overcurrent threshold to suppress failure in the battery pack while there is heightened risk for such failure due to the relatively long discharge period, and can raise the overcurrent threshold to maximize performance of the power tool 200 when there is low risk of failure in the battery pack 100 owing to the relatively long discharge period.

Since the power tool 200 to which the battery pack 100 is attached interrupts discharge in response to a halt signal, the battery pack 100 can halt discharge simply by outputting an FET OFF signal. As a result, the battery pack 100 can have a simplified construction that improves ease of assembly.

The power tool 200 according to the present embodiment is configured such that the battery pack 100 can be attached thereto. Further, the power tool 200 includes the FET 230 that halts driving of the motor 210 when an FET OFF signal is outputted from the battery pack 100. Accordingly, the structure of the embodiment can maximize performance of the power tool 200 while suppressing failure in the battery pack 100 when the battery pack 100 is used as the driving power source of the power tool 200.

The power tool 200 interrupts the discharge current flowing though the motor 210 when an FET OFF signal is outputted from the battery pack 100. By interrupting the flow of current to the motor 210 in this way, the drive of the power tool 200 can be halted through a simple configuration.

In the present embodiment described above, the microcomputer 170, shunt resistor 150, current measuring circuit 160, and temperature measuring circuit 140 are provided in the battery pack 100, but the same operations advantages described in the present embodiment can be obtained when the microcomputer 170, shunt resistor 150, current measuring circuit 160, and temperature measuring circuit 140 (excluding the thermistor) are disposed in the power tool 200. With this configuration, the microcomputer 170 can be used to control a brushless motor driven by an inverter circuit in the power tool 200.

While the invention has been described in detail with reference to a battery pack and power tool according to the second embodiment of the invention, it would be apparent to those skilled in the art that various changes and modifications may be made therein without departing from the scope of the invention. For example, the microcomputer 170 of the battery pack 100 is configured to perform discharge control in the present embodiment, but the FET control unit 240 of the power tool 200 may be replaced with a microcomputer configured to perform discharge control. In this case, the microcomputer 170 of the battery pack 100 is preferably configured to transmit information about measured value for the battery temperature, discharge period, and discharge current to the microcomputer in the power tool 200.

REFERENCE SINGS LIST

10: power tool, 11: control circuit, 12: motor, 15: shutdown circuit, 17: current detection circuit, 19: trigger switch, 50: battery pack, 51: protection circuit, 53: secondary battery, 53a: battery cell, 57: thermistor, 59: thermal protector, 100: battery pack, 100A: positive discharge terminal, 100B: negative discharge terminal, 100C: signal output terminal, 200: power tool, 200A: positive input terminal, 200B: negative input terminal, 200C signal input terminal, 200a: junction point, 110: cell-connected battery, 110A: battery cell, 120: battery protection IC, 130: power supply circuit, 140: temperature measuring circuit, 150: shunt resistor, 160: current measuring circuit, 170: microcomputer, 210: motor, 220: trigger switch, 230: FET, 240: FET control unit, 250: holding circuit

The invention claimed is:

1. A power tool system comprising:
a battery pack including at least one secondary battery cell; and
a power tool being capable of continuously performing a desired operation by virtue of discharge current supplied from the secondary battery cell,
wherein in a state where the power tool is driven and the discharge current shows a behavior to once increase and then decrease, the power tool is configured to halt the desired operation when the discharge current having a current value greater than or equal to a predetermined value continues to flow for a predetermined period of time, and
wherein when comparing a first case where the power tool is operated in a first state that the battery temperature of the secondary battery cell is at a first temperature and the power tool is driven with a first discharge current having a value greater than or equal to the predetermined value, with a second case where the power tool is operated in a second state that the battery temperature of the secondary battery cell is at a second temperature higher than the first temperature and the power tool is driven with the first discharge current, the predetermined continuous period of time is longer in the first state than in the second state.

2. The power tool system according to claim 1, wherein the power tool comprises:
a motor, and
a switching element disposed between the motor and the secondary battery cell and configured to cut off a discharge current path therebetween after the period of time elapses.

3. A power tool group comprising:
a battery pack including a battery cell, a battery protection portion configured to output a signal indicating an abnormal state of the battery pack, and a signal output terminal configured to output the signal; and
a plurality of different types of power tools including a first power tool and a second power tool,
wherein the first power tool comprises:
a first signal input terminal connectable to the signal output terminal;
a first motor capable of being driven by power supplied from the battery pack; and
a first controller configured to perform stopping the first power tool in response to the signal received from the battery pack when the battery pack is used for the first power tool, and
wherein the second power tool comprises:
a second signal input terminal connectable to the signal output terminal;
a second motor capable of being driven by power supplied from the battery pack; and
a second controller configured to perform continuing operating the second power tool irrespective of the signal being received from the battery pack when the battery pack is used for the second power tool.

4. The power tool group according to claim 3, wherein the signal is produced while referring to a prescribed value of at least one of a plurality of predetermined parameters.

5. The power tool group according to claim 3, wherein the second power tool has a control mode switchable between:
a first mode under which the second motor is halted in response to the signal; and
a second mode under which the second motor is continuously rotated irrespective of the signal.

6. The power tool group according to claim 3, wherein the battery pack includes a battery protection portion configured to monitor for monitoring a state of the battery cell,
wherein the battery protection portion is further configured to output the signal when current flowing through the battery cell is continuously greater than or equal to a first prescribed value for a first prescribed period of time, and wherein the second power tool is configured to halt the second motor on the basis of the signal when temperature of the battery cell is higher than a first predetermined value.

7. The power tool group according to claim 6, wherein the second power tool is further configured to:
   set an allowable current value and a current flow continuous period when the temperature of the battery cell is lower than the first predetermined value; and
   in a case where the temperature of the battery cell is low, set the allowable current value to a lower value than that in a case where the temperature of the battery cell is high and further set the current flow continuous period to a longer period than that in a case where the temperature of the battery cell is high, and
   halt the second motor after expiration of the set current flow continuous period.

8. The power tool group according to claim 3, wherein the second motor is halted in response to the signal when the temperature of the battery cell is higher than the first predetermined value, whereas the second motor continues to rotate irrespective of the signal when the temperature of the battery cell is lower than or equal to the first predetermined value.

9. The power tool group according to claim 8, wherein an allowable current value and a current flow continuous period are set when the temperature of the battery cell is lower than the first predetermined value,
   wherein in a case where the temperature of the battery cell is low, the allowable current value is set to a lower value than that in a case where the temperature of the battery cell is high and the current flow continuous period is set to a longer period than that in a case where the temperature of the battery cell is high, and
   wherein the second motor is halted after expiration of the set current flow continuous period.

10. The power tool group according to claim 3, wherein the battery protection portion is configured to output the signal indicating a second abnormal state when the voltage of the battery cell is lower than or equal to the predetermined voltage value, and
   wherein the second motor is halted when the signal indicating the second abnormal state is inputted to the signal input terminal.

11. A power tool system comprising:
   a battery pack including a battery cell and a battery protection portion configured to monitor a state of the battery cell; and
   a power tool including a motor capable of being driven by power supplied from the battery pack, a current detection part configured to detect current flowing through a current path between the battery cell and the motor, and a controller configured to control the motor,
   wherein the battery protection portion is configured to output an abnormality signal when current flowing through the current path is greater than or equal to a first prescribed value, and
   wherein the controller is configured to continuously rotate the motor even when the abnormality signal is inputted from the battery pack when the current flowing through the current path is greater than or equal to the first prescribed value and smaller than a second prescribed value smaller than the first prescribed value, and further configured to halt the rotation of the motor when the current flowing through the current path is greater than or equal to the second prescribed value.

12. A power tool system comprising:
   a battery pack including a battery cell and a battery protection portion configured to monitor a state of the battery cell; and
   a power tool including a motor capable of being driven by power supplied from the battery pack, a current detection part configured to detect current flowing through a current path between the battery cell and the motor; a battery temperature detector configured to detect temperature of the battery cell; and a controller configured to control the motor,
   wherein the battery protection portion is configured to output an abnormality signal when current flowing through the current path is greater than or equal to a first prescribed value, and
   wherein the controller, in state that temperature of the battery cell is lower than or equal to a predetermined temperature value, is configured to continue to rotate the motor even when the abnormality signal is inputted from the battery pack and to halt to rotate the motor when voltage of the battery cell is lower than or equal to a predetermined voltage value, and
   wherein the controller, in state that temperature of the battery cell is greater than the predetermined temperature value, is configured to halt to rotate the motor when the abnormality signal is inputted from the battery pack.

* * * * *